United States Patent
Wittenbreder, Jr.

(10) Patent No.: US 7,944,188 B1
(45) Date of Patent: May 17, 2011

(54) POWER CONVERTER CIRCUITS HAVING BIPOLAR OUTPUTS AND BIPOLAR INPUTS

(75) Inventor: Ernest Henry Wittenbreder, Jr., Flagstaff, AZ (US)

(73) Assignee: Ernest H. Wittenbreder, Jr, Flagstaff, AZ (US)

( * ) Notice: Subject to any disclaimer, the term of this patent is extended or adjusted under 35 U.S.C. 154(b) by 291 days.

(21) Appl. No.: 12/267,565

(22) Filed: Nov. 8, 2008

Related U.S. Application Data

(60) Provisional application No. 60/986,524, filed on Nov. 8, 2007.

(51) Int. Cl.
*G05F 1/10* (2006.01)
(52) U.S. Cl. ....................................... 323/222
(58) Field of Classification Search .................. 323/222, 323/223, 225, 268, 271, 282
See application file for complete search history.

(56) References Cited

U.S. PATENT DOCUMENTS

| | | | | |
|---|---|---|---|---|
| 5,793,626 A | * | 8/1998 | Jiang | 363/126 |
| 6,498,463 B2 | * | 12/2002 | Chang | 323/222 |
| 6,828,762 B2 | * | 12/2004 | Brkovic | 323/222 |

* cited by examiner

*Primary Examiner* — Matthew V Nguyen

(57) ABSTRACT

A new bipolar output boost converter for ac input applications is revealed. The new boost converter is bridgeless, i.e., it does not require use of a line frequency diode rectifier which improves the efficiency of the converter significantly. The new bipolar boost converter does not include the common mode noise generating mechanisms of prior art ac input bridgeless boost rectifier circuits, thereby easing electromagnetic compatibility problems. Although the new converter requires two output filter capacitors, total capacitor stored energy is the same as other boost converters of the same power level so that capacitor volume and cost is not significantly adversely effected. Zero voltage switching cells which can be substituted for a switch to eliminate first order switching losses are also revealed. New three terminal bipolar input source switching networks having operating properties similar to conventional full bridge source switching networks are also revealed.

13 Claims, 24 Drawing Sheets

(Prior Art) Figure 16

POWER CONVERTER CIRCUITS HAVING BIPOLAR OUTPUTS AND BIPOLAR INPUTS

CROSS REFERENCE TO RELATED APPLICATIONS

This application claims the benefit of PPA Ser. No. 60/986,524 filed 2007 Nov. 8 by the present inventor.

BACKGROUND OF THE INVENTION

1. Field of the Invention

The subject invention generally pertains to electronic power conversion circuits, and, more specifically, to high frequency, switched mode electronic power converters. The subject matter relates to new boost power converter circuit topologies having bipolar outputs used for ac to dc power conversion and to power converter topologies having bipolar inputs.

2. Description of Related Art

Bridgeless power factor correction (PFC) boost converters have been known for some time. With the recent establishment of high efficiency legal mandates for power supplies they have become more popular. An example of a prior art bridgeless PFC boost converter is illustrated in FIG. 1. The FIG. 1 circuit does not employ a bridge rectifier, but rather uses the boost converter's switches and rectifiers to accomplish the rectification. The FIG. 1 circuit employs two boost converters that are activated on alternate half cycles of the line voltage source, one converter is activated for the positive half cycle and the other boost converter is activated for the negative half cycle. In FIG. 1 during the positive half cycle of $V_{SOURCE}$ (terminal L positive with respect to terminal N) a boost converter comprising switch SW2, diode D2, LIN, and CFILT is active. During the positive half cycle switch SW1 remains in an on condition for the entire half cycle and diode D1 remains in an off condition for the entire half cycle. During the negative half cycle of $V_{SOURCE}$ (terminal L negative with respect to terminal N) a boost converter comprising switch $S_{W1}$, diode $D_1$, $L_{IN}$, and $C_{FILT}$ is active. During the negative half cycle, switch $S_{W2}$ remains in an on condition and diode D2 remains in an off condition. The FIG. 1 circuit accomplishes higher efficiencies by comparison to more conventional boost PFC circuits, but there are some problems associated with the FIG. 1 circuit. To accomplish PFC a PFC controller needs to regulate line current, which requires an ability to sense line current. In FIG. 1 both terminals of the series network containing the line voltage source and boost inductor are modulated at high frequency. It would be much easier to sense line current if one of the terminals of the input network were connected to an ac ground. Perhaps a bigger problem is the problem of common mode (CM) noise inherent to the FIG. 1 circuit. FIG. 2(a) illustrates the line voltage wave form which indicates the two regions of operation, i.e., positive half cycle (Region 1) and negative half cycle (Region 2). FIG. 2(a) illustrates the voltage wave form of the OUT-terminal during the positive half cycle with respect to terminal N of the line voltage source $V_{SOURCE}$. In a typical application terminal N will be connected to earth ground at the electrical service entrance to a building or installation. During the positive half cycle the OUT-terminal is connected through $S_{W1}$ to terminal N of $V_{SOURCE}$. During the negative half cycle the OUT-terminal is alternately connected and disconnected from terminal N of $V_{SOURCE}$, which results in the voltage wave form of FIG. 2(c) for the OUT-terminal during the negative half cycle (Region 2). A similar ac wave form (not shown) appears at the OUT+ terminal during the negative half cycle. Parasitic capacitances in the circuit, illustrated in FIG. 3 transfer some of the ac signal at the output terminals back to the line voltage source. The ac signals are CM signals and can potentially result in an electromagnetic compliance (EMC) failure. FIG. 4 illustrates a post converter circuit that might be used with the FIG. 1 circuit in a typical application. For many consumer products sold throughout the world the PFC boost rectifier must accommodate ac line voltages ranging from 85 to 265 volts and the boost rectifier would typically have an output dc voltage of about 380 to 400 volts. A typical universal input circuit might use 500 volt rated mosfet switches. The load coupling network illustrated in FIG. 4 might typically contain an LC filter and a load and may or may not also contain a transformer for galvanic isolation plus a rectifier circuit. What is needed is a bridgeless boost circuit that does not have the current sensing problems and CM noise problems of the prior art with similar efficiency advantages.

FIG. 16 illustrates a very simple bridgeless PFC boost converter that can achieve both simple current sensing using a sense resistor placed between the N terminal of $V_{SOURCE}$ and the ground terminal and low common mode noise. Low common mode noise results because both output filter capacitors have a connection to an ac ground and line neutral. Because of the connection of the output filter capacitors to line neutral there can be no high frequency voltage wave forms at the output filter capacitor terminals. FIG. 17 illustrates how the circuit can be implemented using mosfets for the switches. FIG. 18 illustrates a zero voltage switching implementation of the FIG. 16 circuit using a prior art zero voltage switching cell. The FIG. 16 circuit has one significant drawback. The boost converter of FIG. 16 both charges and discharges the output filter capacitors during normal operation. Most boost converters only charge the output filter capacitor. The output filter capacitor of most boost converters is discharged only by the load. The fact that the output filter capacitors are discharged by the FIG. 16 circuit significantly increases the current, power, and thermal stresses of the output filter capacitors. In the FIG. 16 circuit the $C_{FILT-}$ capacitor is discharged when the $C_{FILT+}$ capacitor is charged in region 1 and the $C_{FILT+}$ capacitor is discharged when the $C_{FILT-}$ capacitor is charged in region 2. The net effect is the charging of both capacitors, but additional losses are incurred because of the discharge currents. The additional losses incurred because of discharging is greatest at the minimum ac line voltage which is the worst case condition for the boost converter. What is needed is a bridgeless boost converter having simple current sensing, low CM noise, and no output filter capacitor discharging into the boost converter.

For a unipolar output boost converter a common downstream post converter is illustrated in FIG. 4. For the FIG. 16 circuit the FIG. 4 circuit could be used as a downstream (load side) post converter, but the input voltage to the FIG. 4 circuit, when used with a FIG. 16 boost pre-regulator, is twice the voltage that would typically appear at the output of a typical unipolar output boost pre-regulator. To use the FIG. 4 circuit with a bipolar output boost pre-regulator requires switches with twice the voltage rating of a unipolar boost pre-regulator. For a universal input boost pre-regulator 1000 volt switches would be required. 1000 volt switches are readily commercially available, but 1000 volts represents the high end of what is available in power mosfets and the available choices are reduced considerably in comparison to the choices at 800 volts and below. An equivalent 1000 volt mosfet can be formed by stacking two 500 volt mosfets, but with 500 volt mosfets 8 transistors are required to implement the FIG. 4 circuit. What is needed are solutions for downstream (load side) post converters for bipolar output boost converters that rely on four or fewer 500 volt mosfets with capability and performance equivalent to the FIG. 4 post converter.

OBJECTS AND ADVANTAGES

An object of the subject invention is to reveal new ac input boost converters having higher efficiency than conventional power factor correction boost converters.

Another object of the subject invention is to reveal new ac input boost converters which can employ a simple current sensing mechanism.

Another object of the subject invention is to reveal new ac input boost converters having good CM noise performance.

Another object of the subject invention is to reveal new ac input boost converters that can be used with zero voltage switching networks to accomplish higher conversion efficiency at higher switching frequencies.

Another object of the subject invention is to reveal new source switching networks that can operate from three terminal bipolar voltage sources.

Further objects and advantages of my invention will become apparent from a consideration of the drawings and ensuing description.

These and other objects of the invention are provided by novel boost circuit structures that eliminate or reduce CM noise coupling mechanisms, provide simple structures for sensing input current, and provide high efficiency at high switching frequencies.

BRIEF DESCRIPTION OF THE DRAWINGS

The present invention is illustrated by reference to the drawings.

FIG. 2(*b*) illustrates an output voltage wave form of the FIG. 1 circuit during a positive half cycle.

FIG. 2(*c*) illustrates an output voltage wave form of the FIG. 1 circuit during a negative half cycle.

FIG. 6(*b*) illustrates a positive output voltage wave form of the FIG. 5 circuit during either a positive line voltage half cycle or a negative line voltage half cycle according to the subject invention.

FIG. 6(*c*) illustrates a negative output voltage wave form of the FIG. 5 circuit during either a positive line voltage half cycle or a negative line voltage half cycle according to the subject invention.

FIG. 8(*b*) illustrates how two mosfets can be combined to form a switch with bi-directional voltage blocking capability.

FIG. 8(*c*) illustrates how two mosfets can be combined to form a switch with bi-directional voltage blocking capability.

FIG. 19(*b*) illustrates a timing wave form for the $S_B$ switch for the circuit of FIG. 7 operating with pulse width modulation.

FIG. 19(*c*) illustrates a timing wave form for the $S_C$ switch for the circuit of FIG. 7 operating with pulse width modulation.

FIG. 19(*d*) illustrates a timing wave form for the $S_D$ switch for the circuit of FIG. 7 operating with pulse width modulation.

FIG. 20(*b*) illustrates a timing wave form for the $S_B$ switch for the circuit of FIG. 7 operating with phase shift modulation.

FIG. 20(*c*) illustrates a timing wave form for the $S_C$ switch for the circuit of FIG. 7 operating with phase shift modulation.

FIG. 20(*d*) illustrates a timing wave form for the $S_D$ switch for the circuit of FIG. 7 operating with phase shift modulation.

FIG. 21(*b*) illustrates a load coupling network for an isolated full wave forward converter.

FIG. 21(*c*) illustrates a load coupling network for an isolated full wave coupled inductor buck converter.

FIG. 22(*b*) illustrates a timing wave form for the $S_B$ switch for the circuit of FIG. 11 operating with three state pulse width modulation.

FIG. 22(*c*) illustrates a timing wave form for the $S_C$ switch for the circuit of FIG. 11 operating with three state pulse width modulation.

FIG. 22(*d*) illustrates a timing wave form for the $S_D$ switch for the circuit of FIG. 11 operating with three state pulse width modulation.

SUMMARY

The subject invention reveals a new bridgeless ac input boost power converter circuit which eliminates common mode noise generating mechanisms of prior art bridgeless ac input boost power converters. The new circuit topologies also provide for simple input current sensing for power factor correction applications. The subject invention also reveals bridgeless ac input boost converters having zero voltage switching. Source switching networks that can be used with the bipolar voltage outputs of the new bridgeless ac input boost converters are revealed.

DESCRIPTION OF THE PREFERRED EMBODIMENTS

Figure 5:
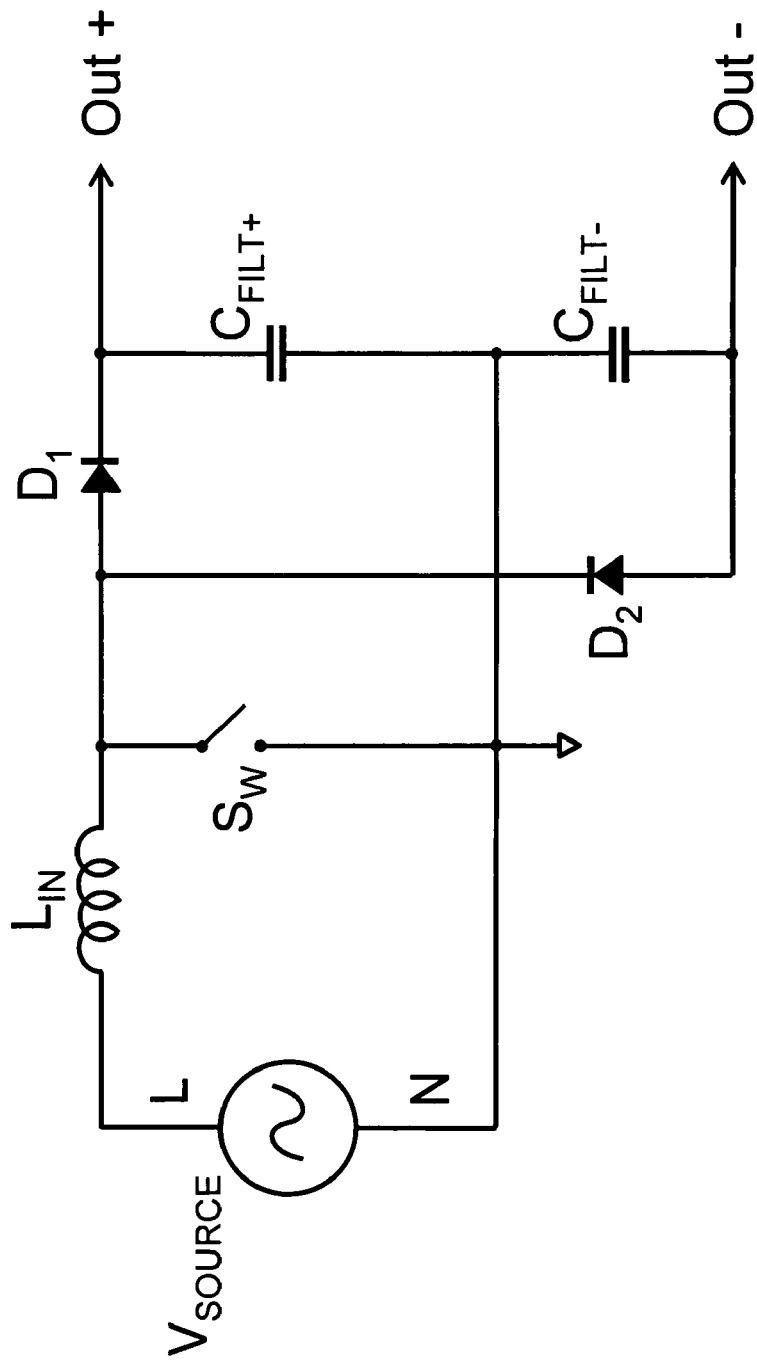
FIG. 5 illustrates an improved ac input bridgeless bipolar output boost converter according to the subject invention.

FIG. 5 illustrates an ac input bipolar output boost converter according to the subject invention. In FIG. 5 an input series network comprising an ac source of voltage, current, and power, $V_{SOURCE}$, is connected to an input series inductance, $L_{IN}$. $L_{IN}$ may be either a discrete series inductor or an inherent series inductance of the source of ac power. A first terminal of the series input network is connected to an output neutral terminal. A first main terminal of a switch $S_W$ is connected to a second terminal of the input series network and a second main terminal of switch $S_W$ is connected to a first terminal of the input series network. An anode terminal of a rectifier switch $D_1$ is connected to the second terminal of the input series network. A cathode terminal of $D_1$ is connected to a positive dc output terminal. An anode terminal of a rectifier switch $D_2$ is connected to a negative dc output terminal and a cathode terminal of rectifier switch $D_2$ is connected to the second terminal of the input series network and to the first main terminal of switch $S_W$. A first terminal of a capacitor $C_{FILT+}$ is connected to the positive dc output terminal and a second terminal of $C_{FILT+}$ is connected to the output neutral terminal. A first terminal of a capacitor $C_{FILT-}$ is connected to the output neutral terminal and a second terminal of capacitor $C_{FILT-}$ is connected to the negative dc output terminal.

Figure 13:
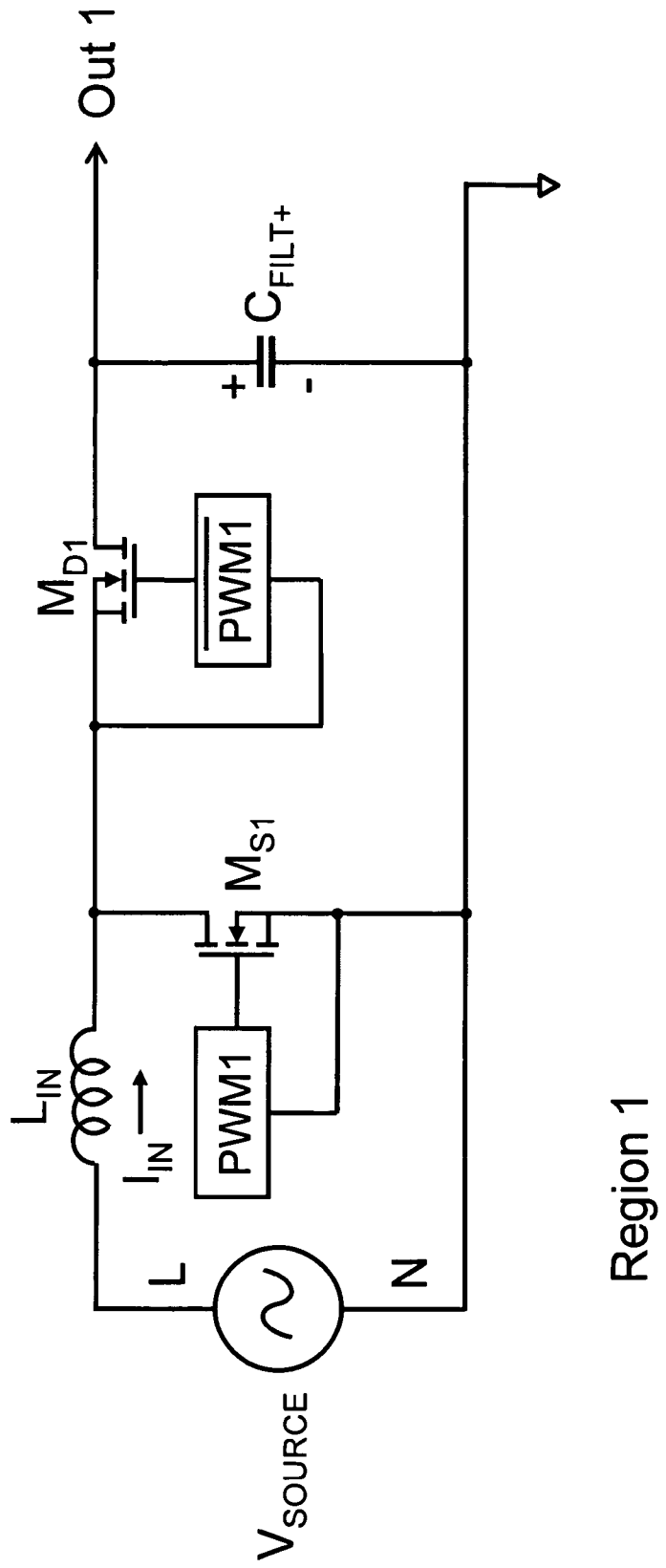
FIG. 13 illustrates an equivalent active circuit of the FIG. 12 circuit in region 1 according to the subject invention.

In operation during a first operating condition (Region 1) the current in the ac source is positive, the current in $L_{IN}$ is from left to right in FIG. 5, and the average voltage of the second terminal of the input series network is positive with respect to the first terminal of the input series network. In a first switch state $S_W$ is on and both rectifier switches are off and current and magnetic stored energy in $L_{IN}$ are ramping up (increasing). When $S_W$ is turned off and rectifier switch $D_1$ is turned on a second switch state is initiated. During the second switch state current flows through $D_1$ to $C_{FILT+}$ charging $C_{FILT+}$. During the second switch state $D_1$ is conducting current and magnetic stored energy in $L_{IN}$ are ramping down (decreasing). FIG. 13 illustrates the region 1 effective circuit with $S_W$ implemented using a mosfet.

Figure 14:
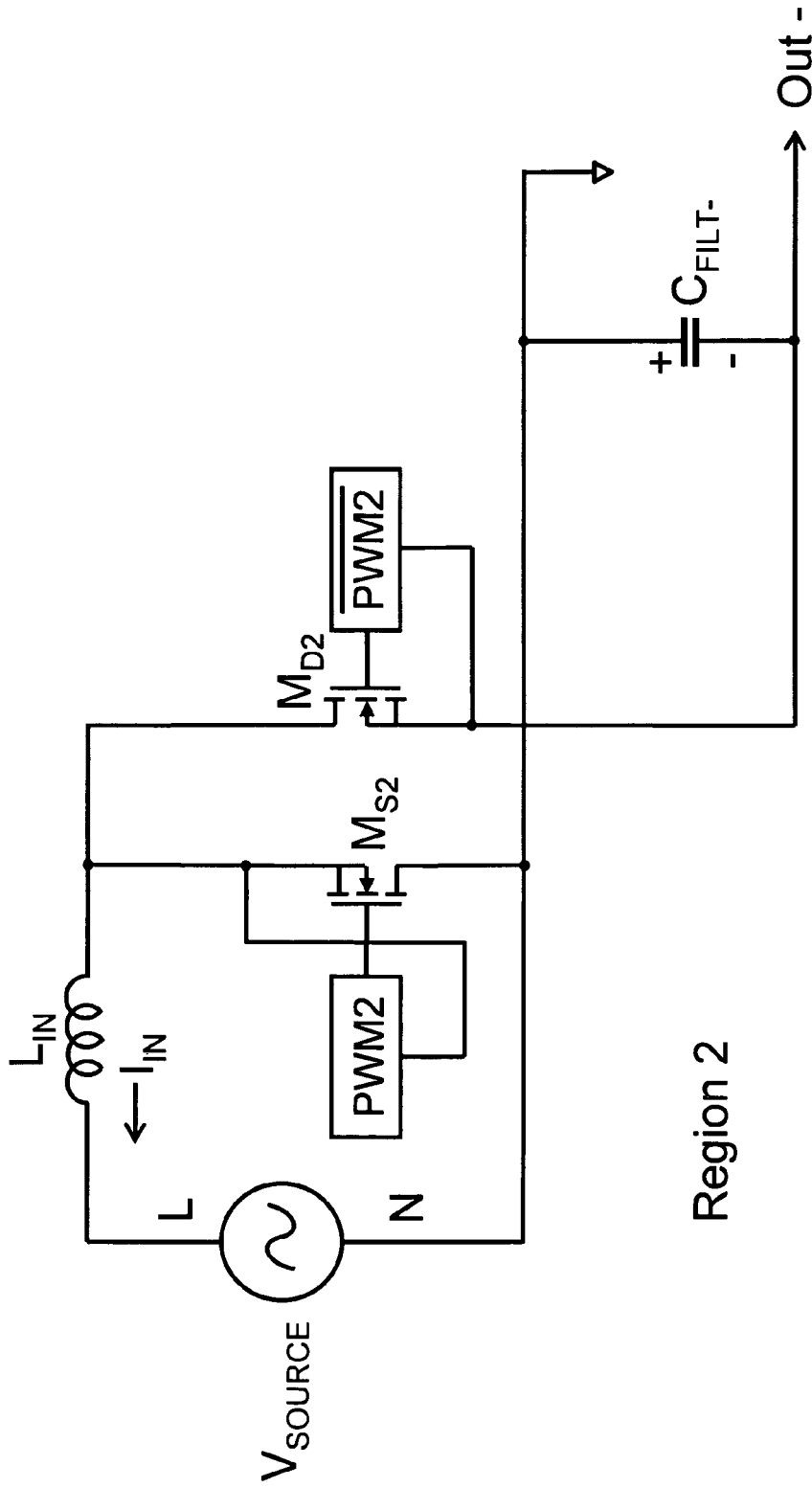
FIG. 14 illustrates an equivalent active circuit of the FIG. 12 circuit in region 2 according to the subject invention.

In operation during a second operating condition (Region 2) the current in the ac source is negative, the current in $L_{IN}$ is from right to left in FIG. 5, and the average voltage of the second terminal of the input series network is negative with respect to the first terminal of the input series network. In a first switch state $S_W$ is on and both rectifier switches are off and current and magnetic stored energy in $L_{IN}$ are ramping up (increasing). When $S_W$ is turned off and rectifier switch $D_2$ is turned on a second switch state is initiated. During the second switch state current flows through $D_2$ to $C_{FILT-}$ charging $C_{FILT-}$. During the second switch state $D_2$ is conducting current and magnetic stored energy in $L_{IN}$ is ramping down (decreasing). FIG. 14 illustrates the region 2 effective circuit with $S_W$ implemented using a mosfet.

Figure 6:
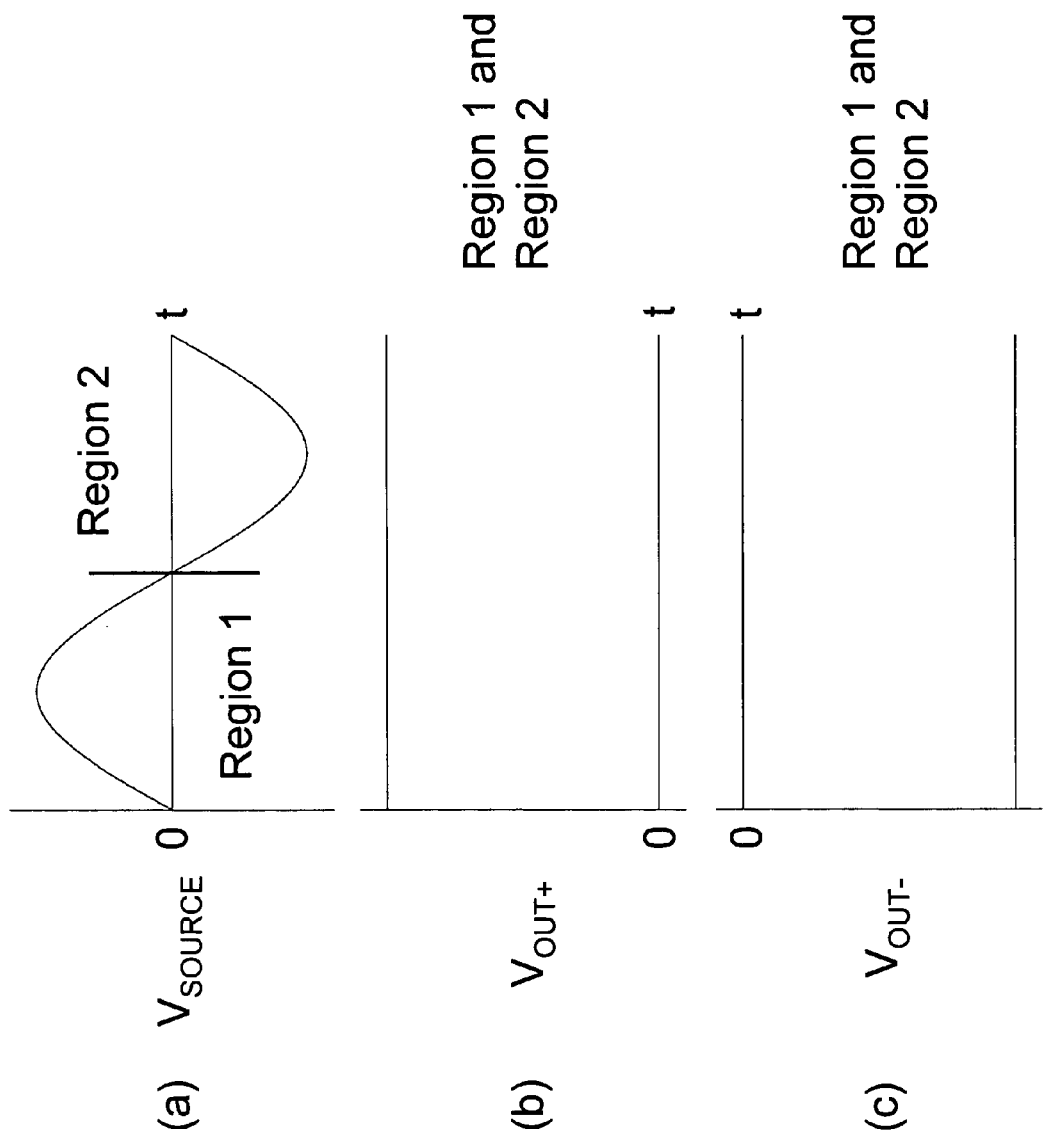
FIG. 6(*a*) illustrates a line voltage wave form divided into positive and negative current regions.

FIG. 6(a) illustrates the voltage source wave form. FIG. 6(b) illustrates the voltage wave form at the positive dc output terminal with respect to the neutral dc output terminal and the N (neutral) terminal of the ac voltage source and FIG. 6(c) illustrates the voltage wave form at the negative dc output terminal with respect to the neutral dc output terminal and the N (neutral) terminal of the ac voltage source.

From FIGS. 6(b) and 6(c) it is clear that there is no high frequency switching component at the output terminals as there is in some of the prior art bridgeless boost circuits.

Figure 8:
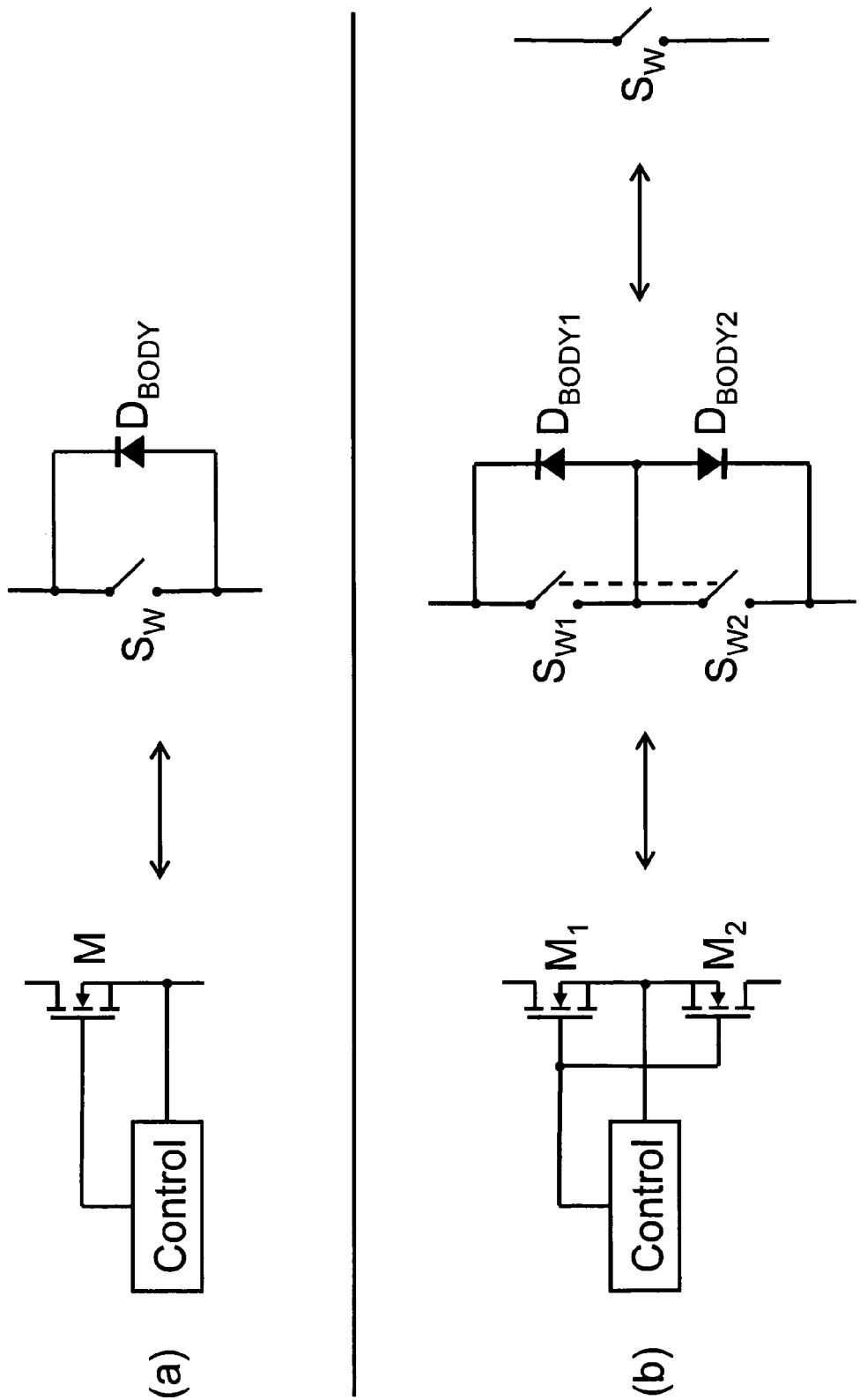
FIG. 8(*a*) illustrates how a mosfet is equivalent to a switch with unidirectional voltage blocking capability.
Figure 8:
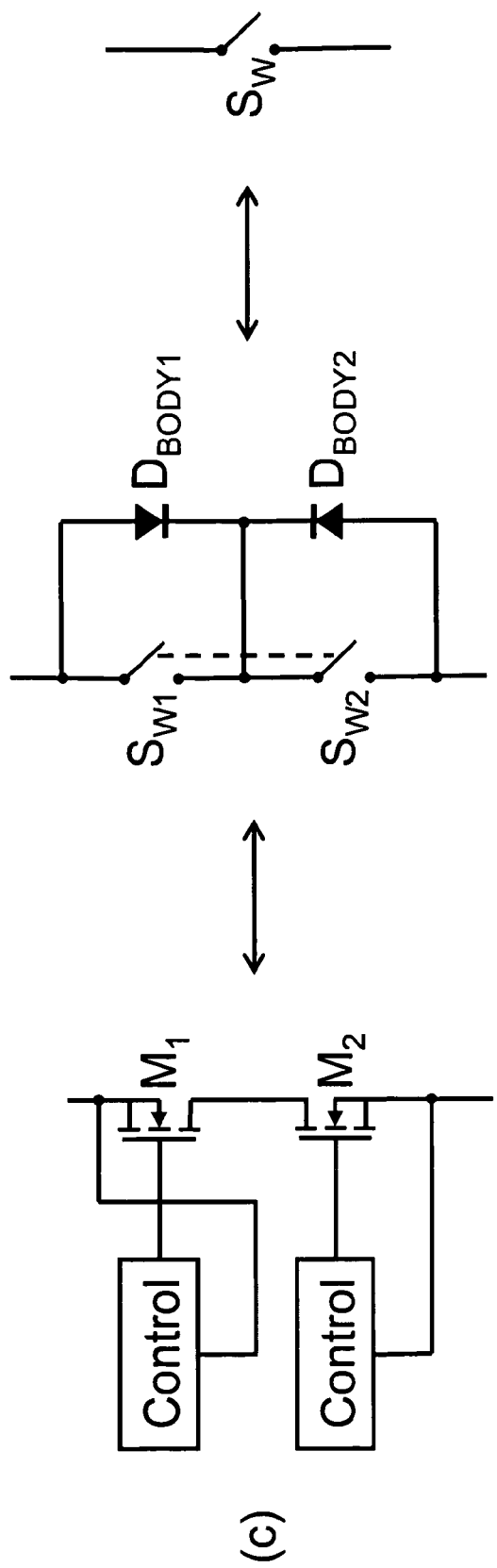
Figure 9:
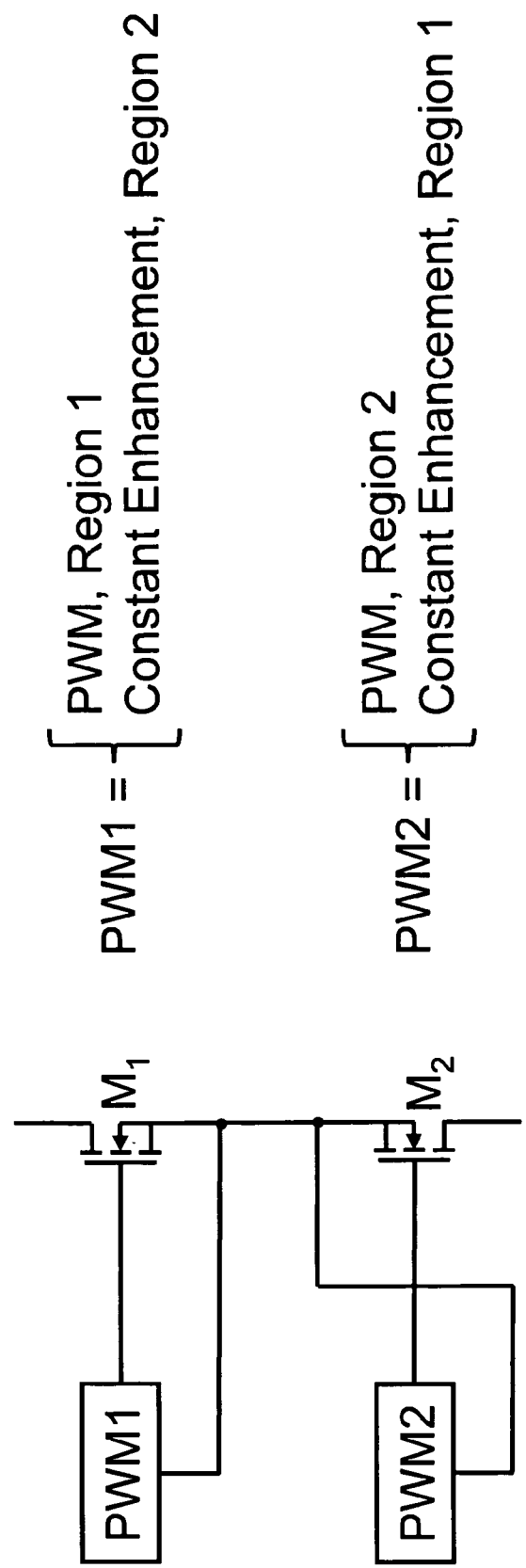
FIG. 9 illustrates a method to reduce gate drive switching losses in a pair of mosfets connected to achieve bi-directional voltage blocking capability.
Figure 10:
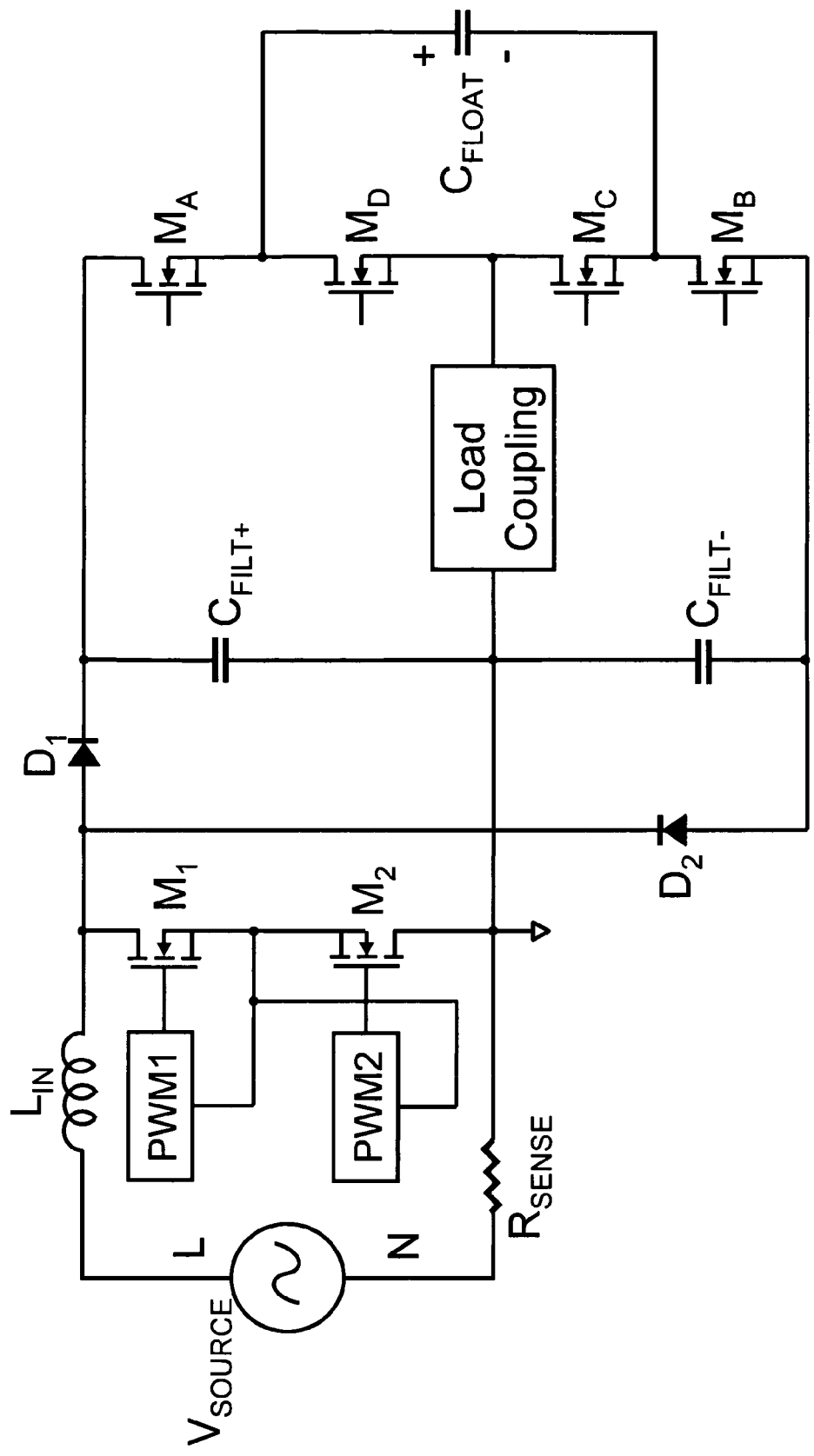
FIG. 10 illustrates the FIG. 5 circuit employing semiconductor switches combined with the FIG. 7 circuit according to the subject invention.
Figure 12:
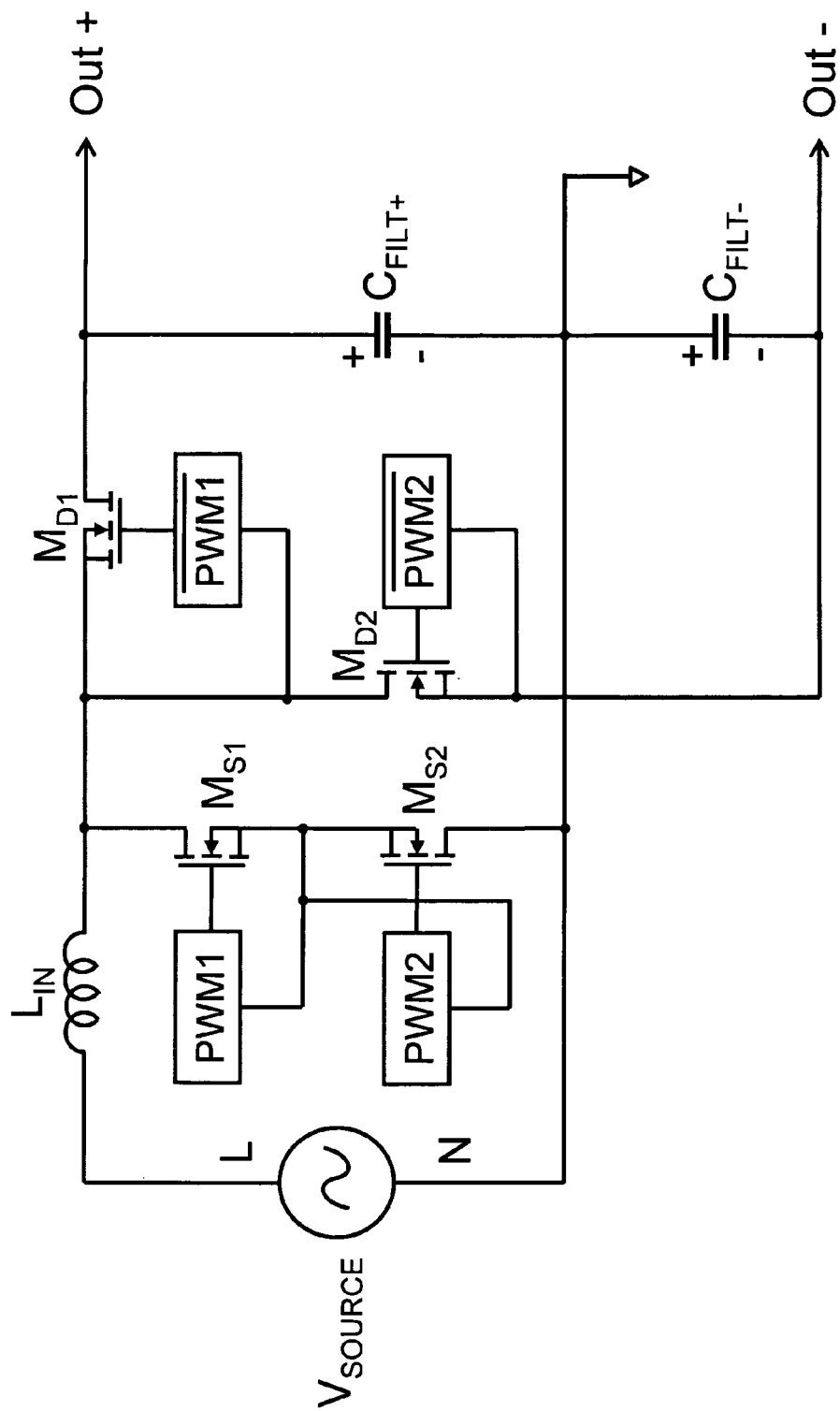
FIG. 12 illustrates the FIG. 5 boost converter with mosfet switches and synchronous rectifiers according to the subject invention.
Figure 15:
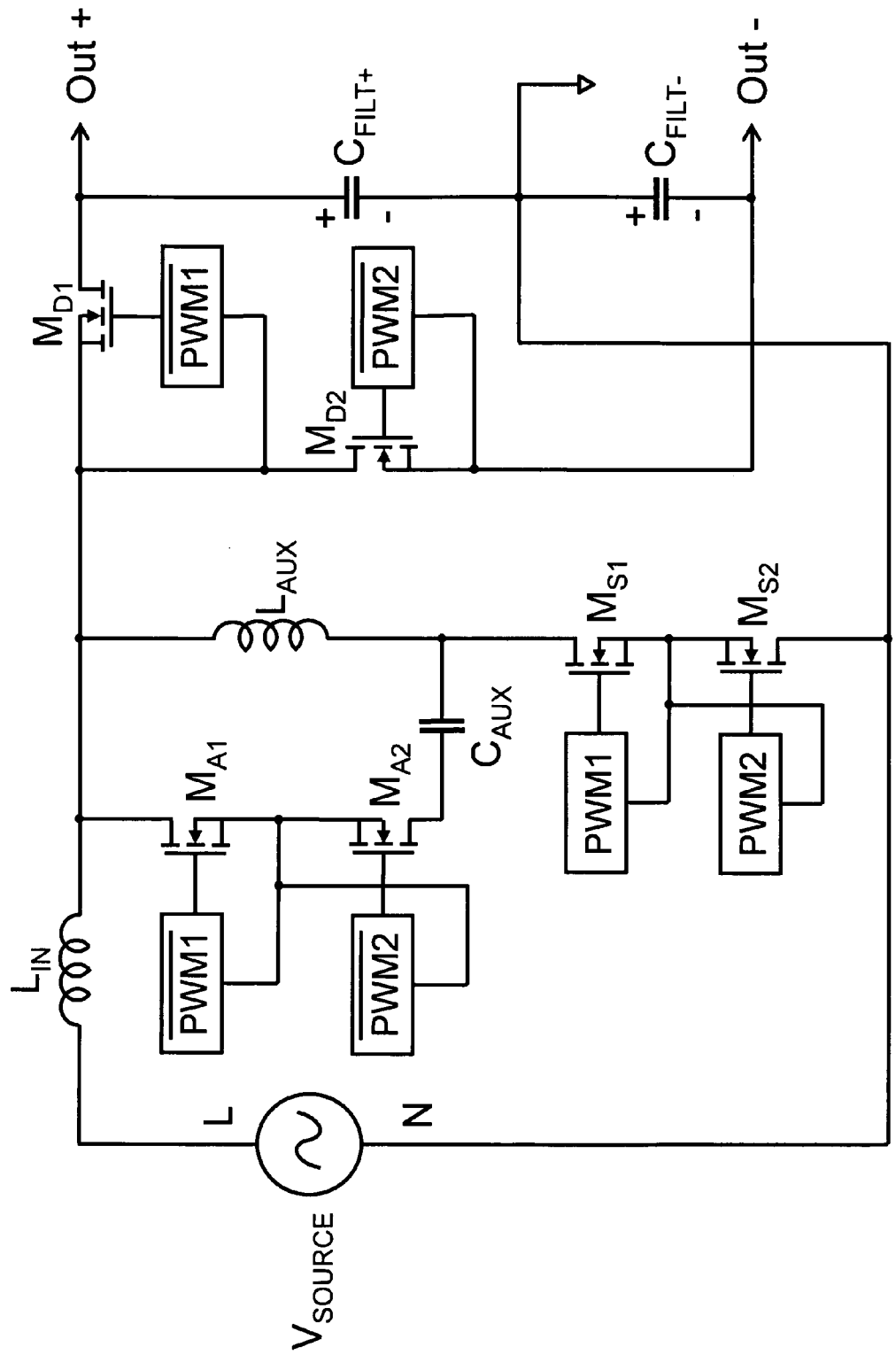
FIG. 15 illustrates the FIG. 12 circuit with a zero voltage switching (ZVS) cell according to the subject invention.
Figure 16:
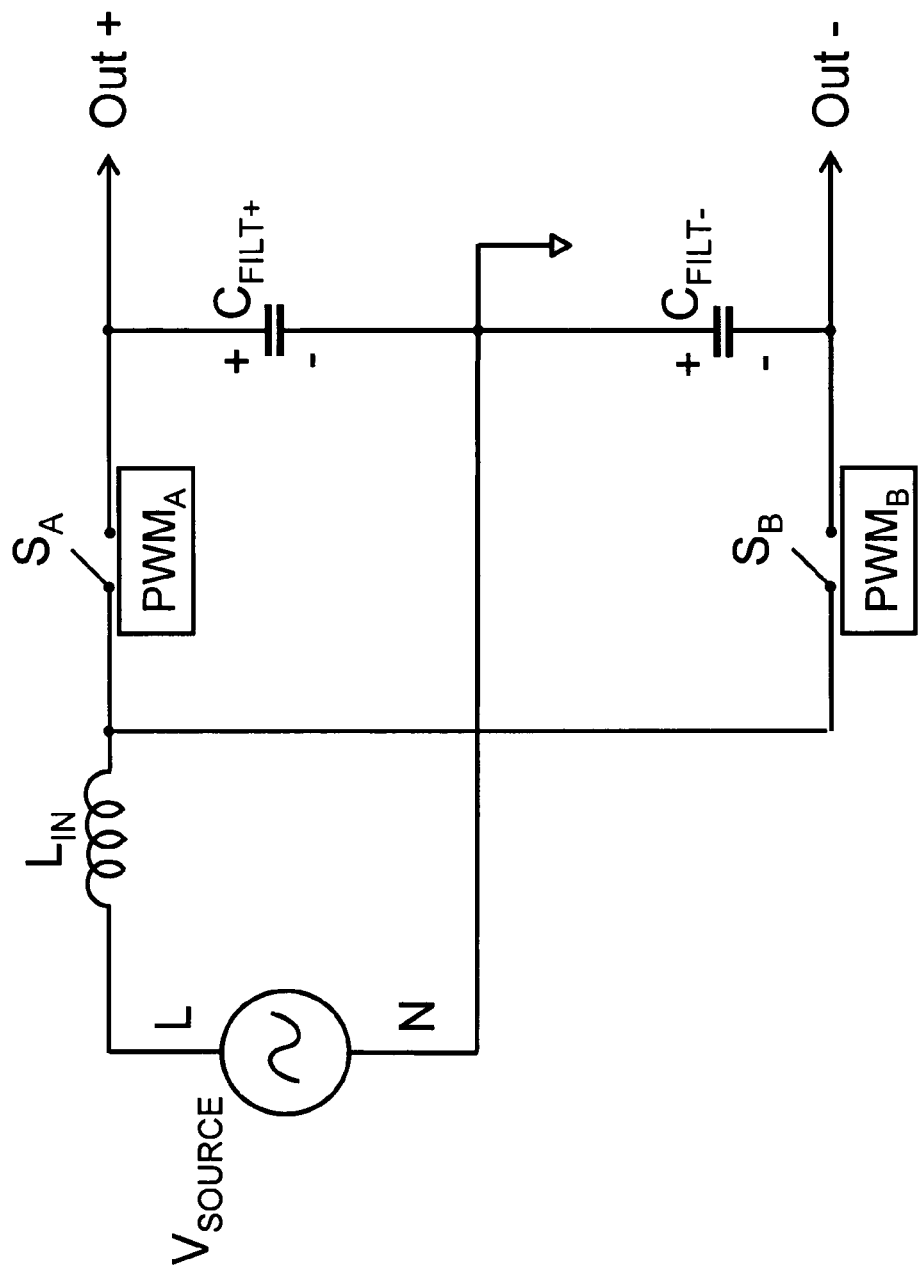
FIG. 16 illustrates an ac input bipolar output boost converter employing only two switches according to the prior art.
Figure 17:
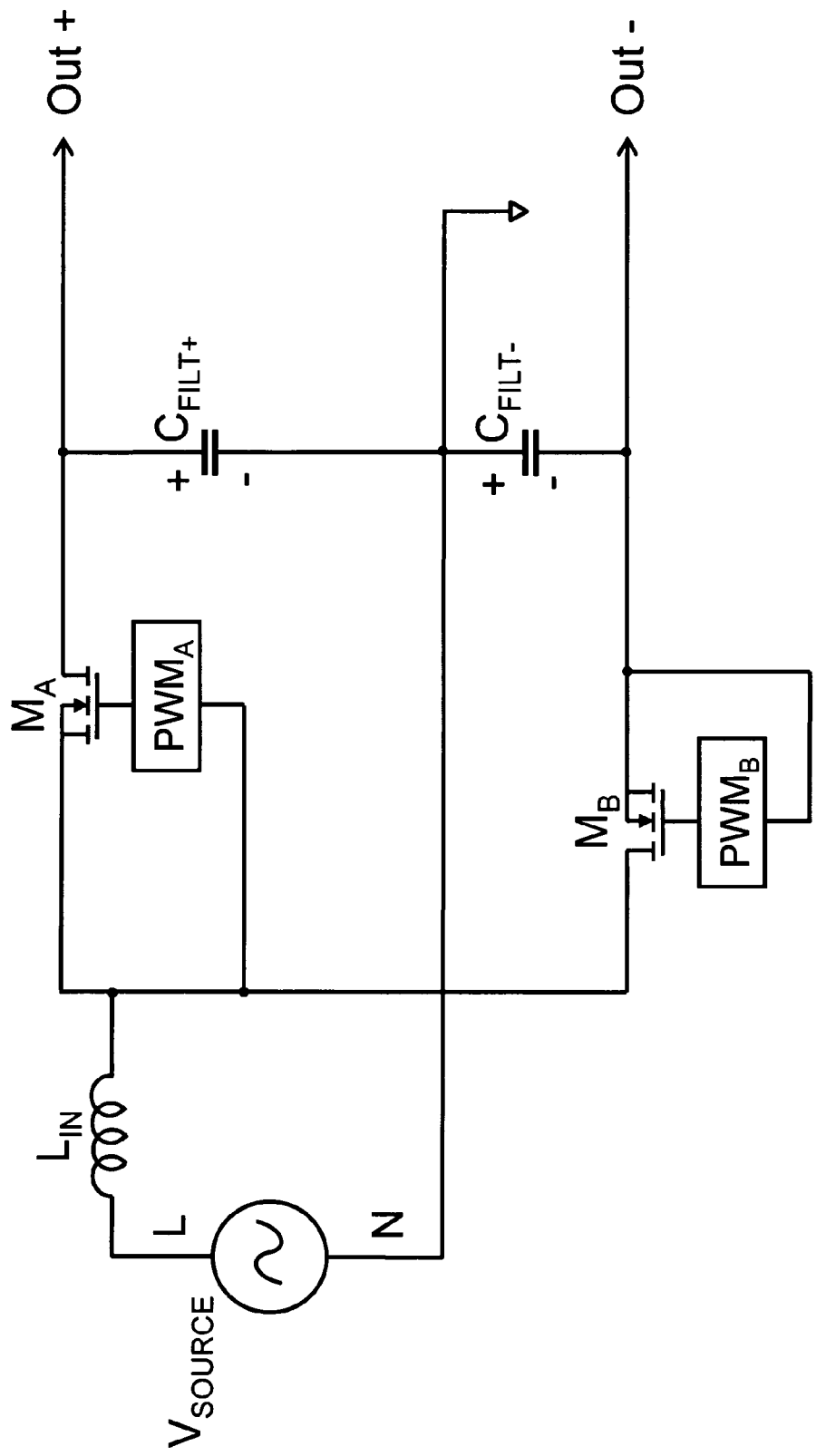
FIG. 17 illustrates the FIG. 16 circuit with the switches implemented using power mosfets according to the prior art.
Figure 18:
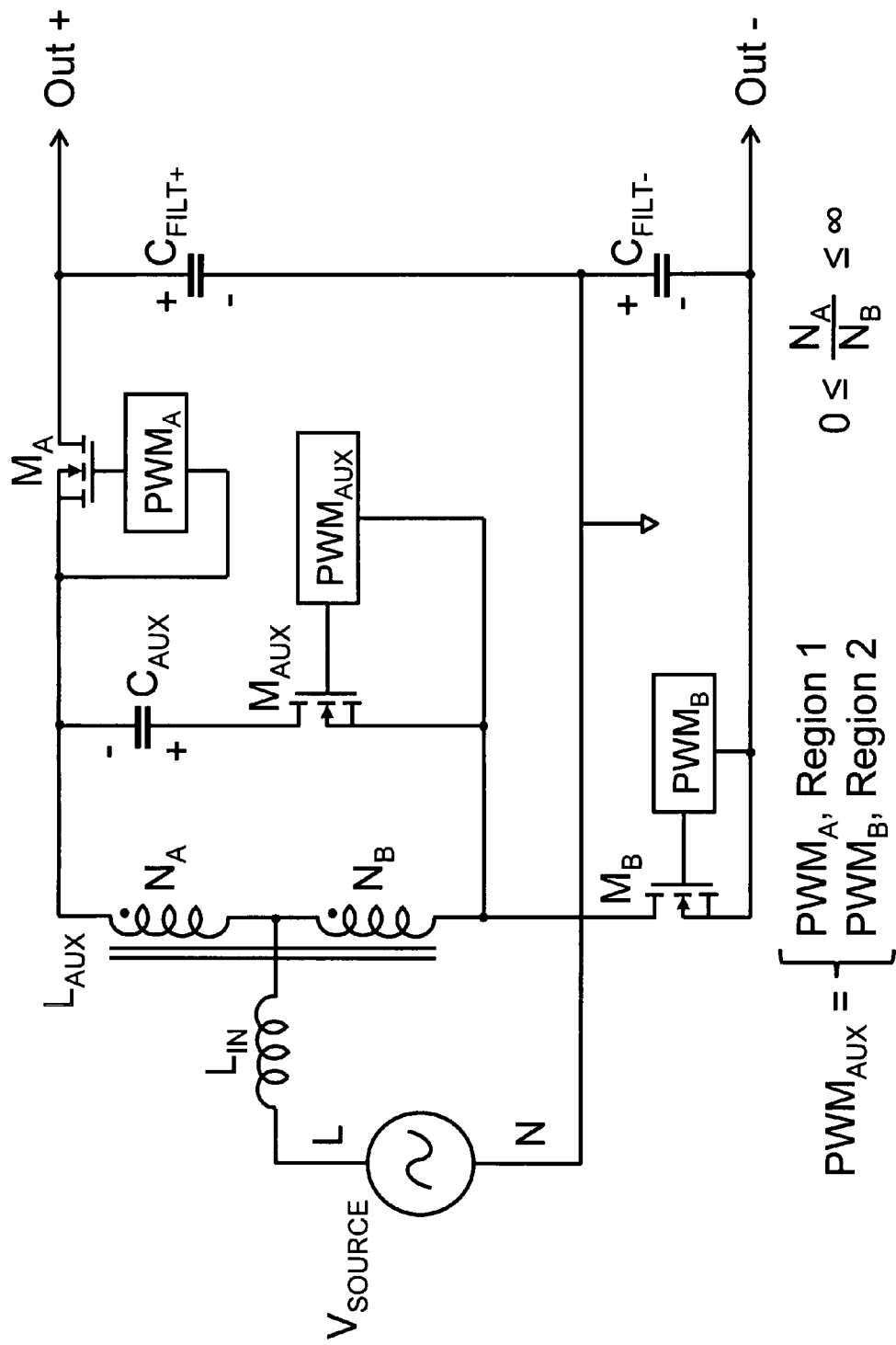
FIG. 18 illustrates the FIG. 17 circuit with a ZVS cell according to the prior art.

The FIG. 5 embodiment requires switch means $S_W$ with bi-directional current flow and bi-directional voltage blocking capabilities. FIG. 8(a) illustrates a power mosfet and its equivalent switch, which has bi-directional current flow capability, but the single mosfet can block voltage in only one direction because of its inherent body diode. FIG. 8(b) illustrates one method of combining two power mosfets so that the composite switch has both bi-directional current flow and bi-directional voltage blocking capabilities. A combination of two IGBTs or combinations of bipolar transistors and diodes can also accomplish switches with bi-directional current flow and bi-directional voltage blocking capability. In FIG. 8(b) the two mosfets are series connected, but oppositely oriented with source terminals connected. FIG. 8(c) illustrates another method of combining two power mosfets so that the composite switch has both bi-directional current flow and bi-directional voltage blocking capabilities. In FIG. 8(c) the two mosfets are series connected, but oppositely oriented with drain terminals connected. FIG. 10 illustrates the FIG. 5 circuit with the $S_W$ switch implemented using two series connected mosfets having a common source connection and with a downstream post regulator using the source switching network illustrated in FIG. 7. It is possible to operate the FIG. 10 circuit with a single common gate source control signal for both boost mosfets. $M_1$ and $M_2$ are the boost mosfets. In order to reduce gate drive switching losses one boost mosfet can be modulated while the other boost mosfet remains fully enhanced for a half cycle of the line voltage source. The conditions for which the boost mosfets can be independently controlled is illustrated in FIG. 9. FIG. 12 illustrates another embodiment similar to the FIG. 10 embodiment, but having mosfets used as synchronous rectifiers rather than rectifier diodes. FIG. 10 also contains a small value current sense resistor, $R_{SENSE}$, in series with the N (neutral) terminal of the line voltage source for simple and direct current sensing. FIG. 15 illustrates a circuit similar to the FIG. 12 circuit but with the addition of a second bi-directional composite switch, an auxiliary capacitor, and an auxiliary inductor for accomplishing zero voltage switching. The zero voltage switching operation of the switching cell contained within the FIG. 15 circuit is described in a prior art patent, U.S. Pat. No. 6,411,153 for uni-directional applications. With a bi-directional composite switch, as indicated in FIG. 15, the zero voltage switching cell described in the cited patent is applicable to the subject invention.

Figure 1:
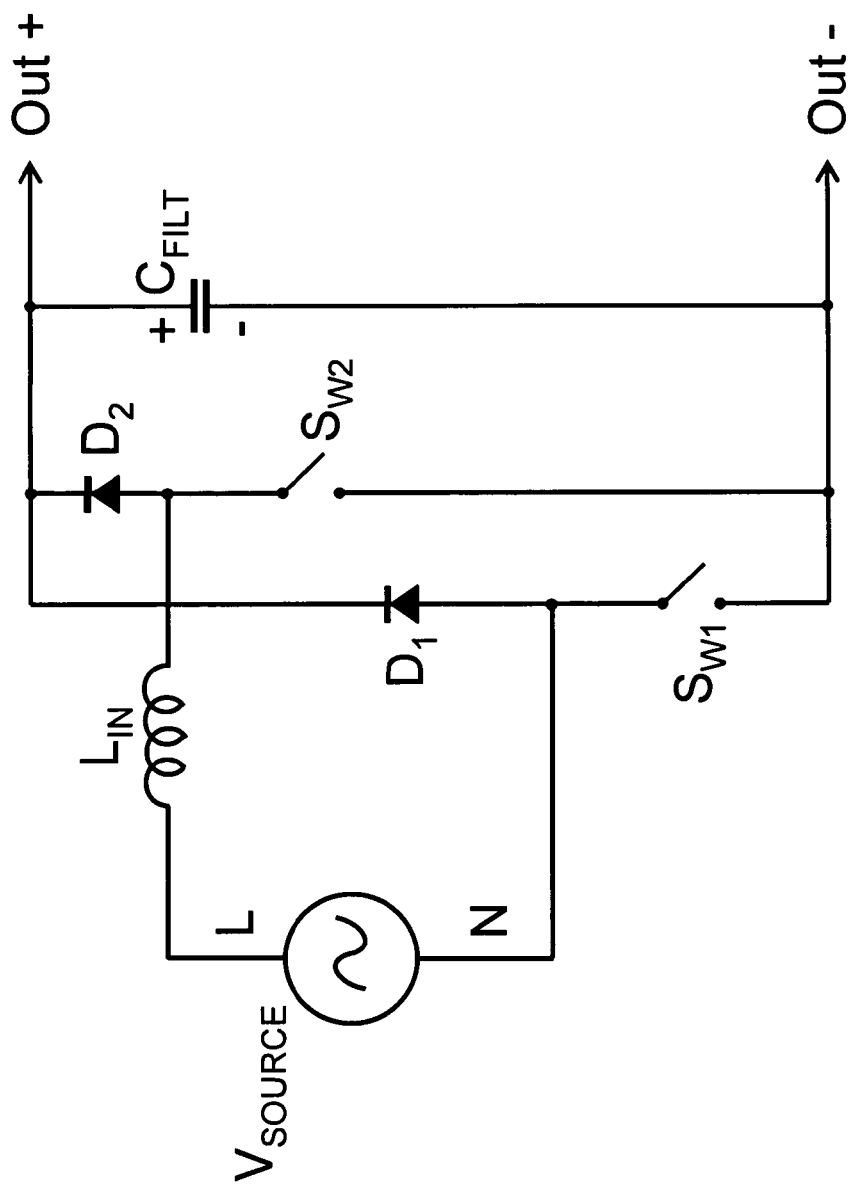
FIG. 1 illustrates an ac input bridgeless boost converter according to the prior art.
Figure 2:
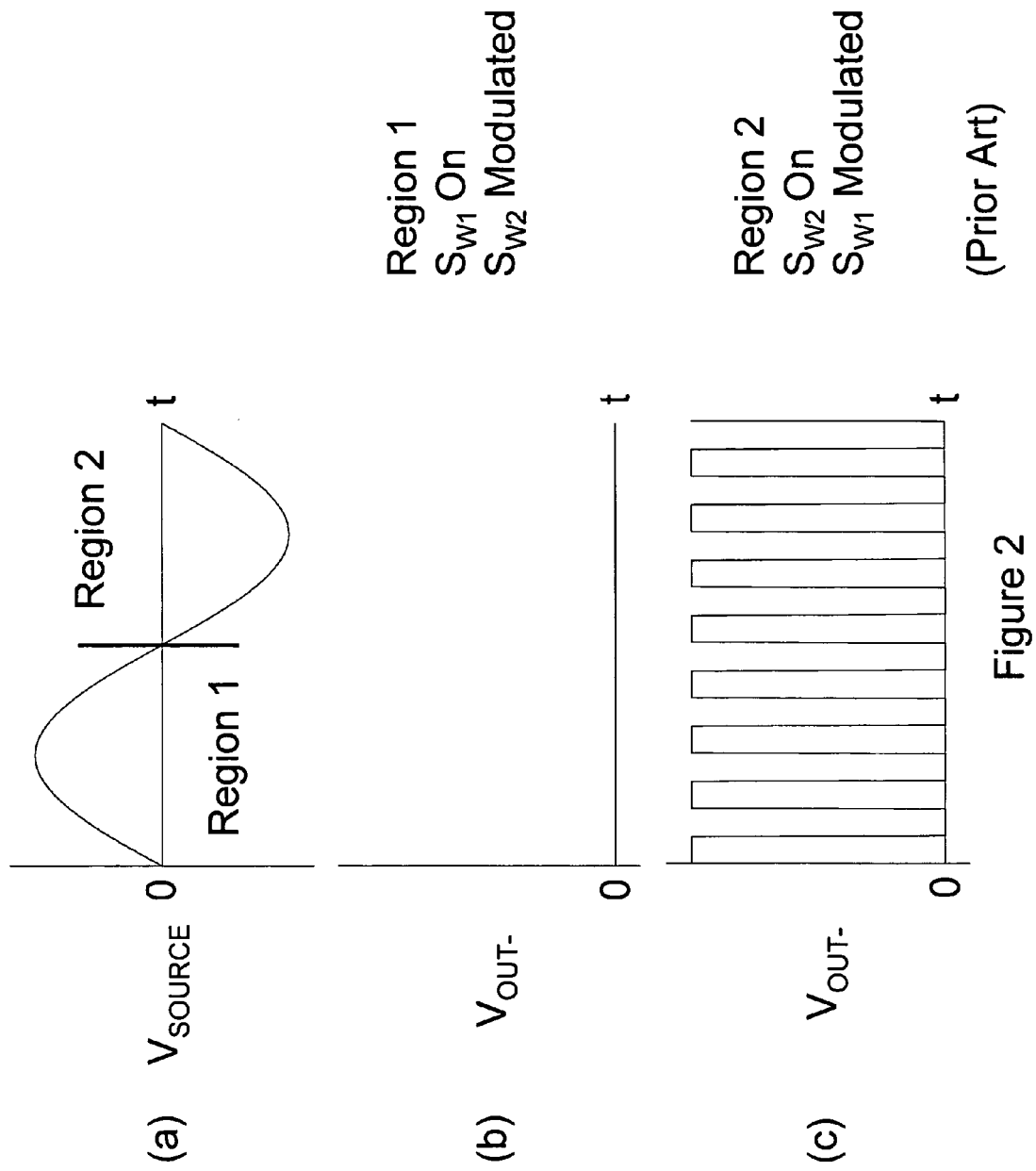
FIG. 2(*a*) illustrates a line voltage wave form divided into positive and negative current regions.
Figure 3:
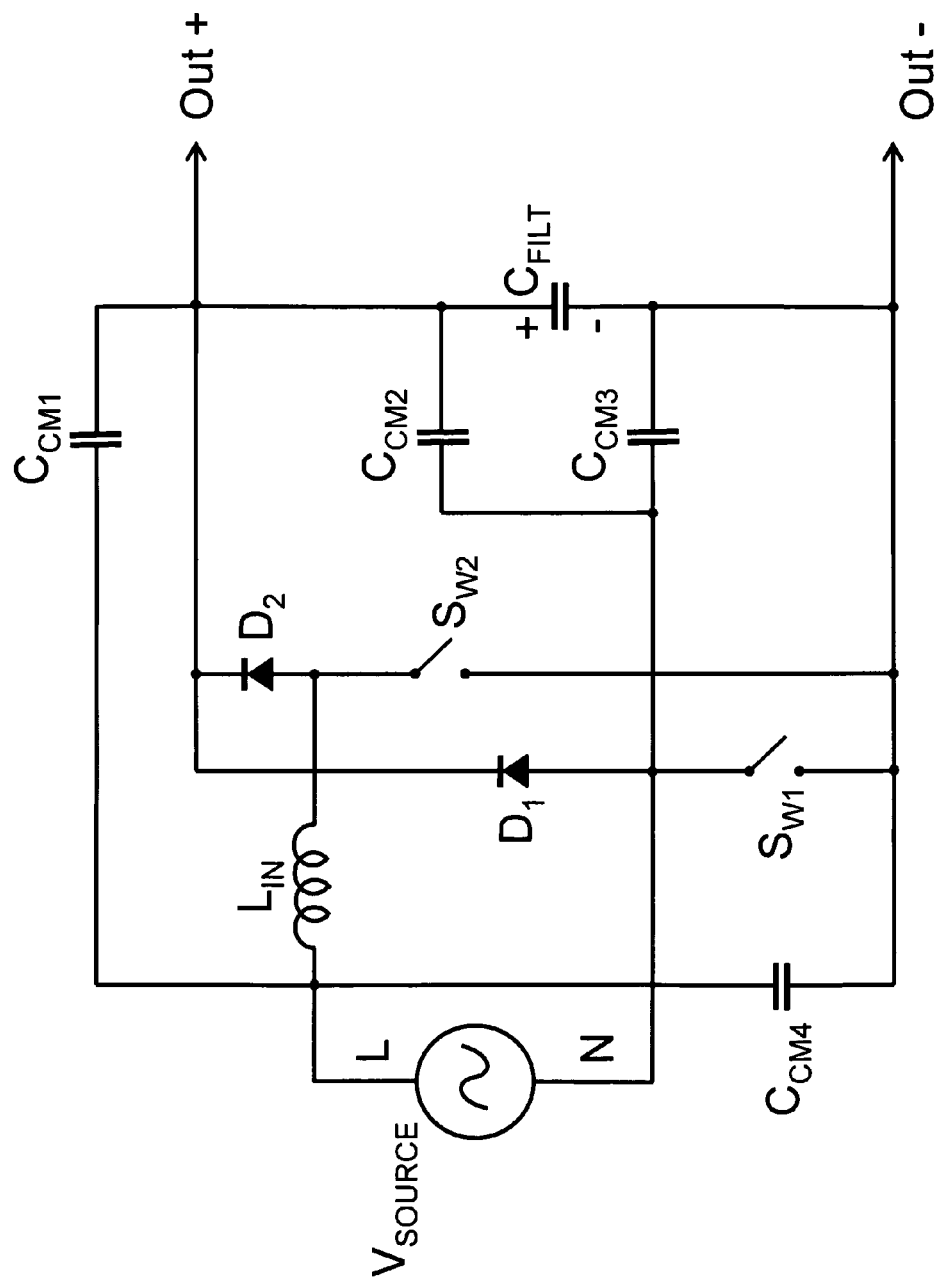
FIG. 3 illustrates the FIG. 1 circuit with CM noise coupling capacitances illustrated according to the prior art.
Figure 4:
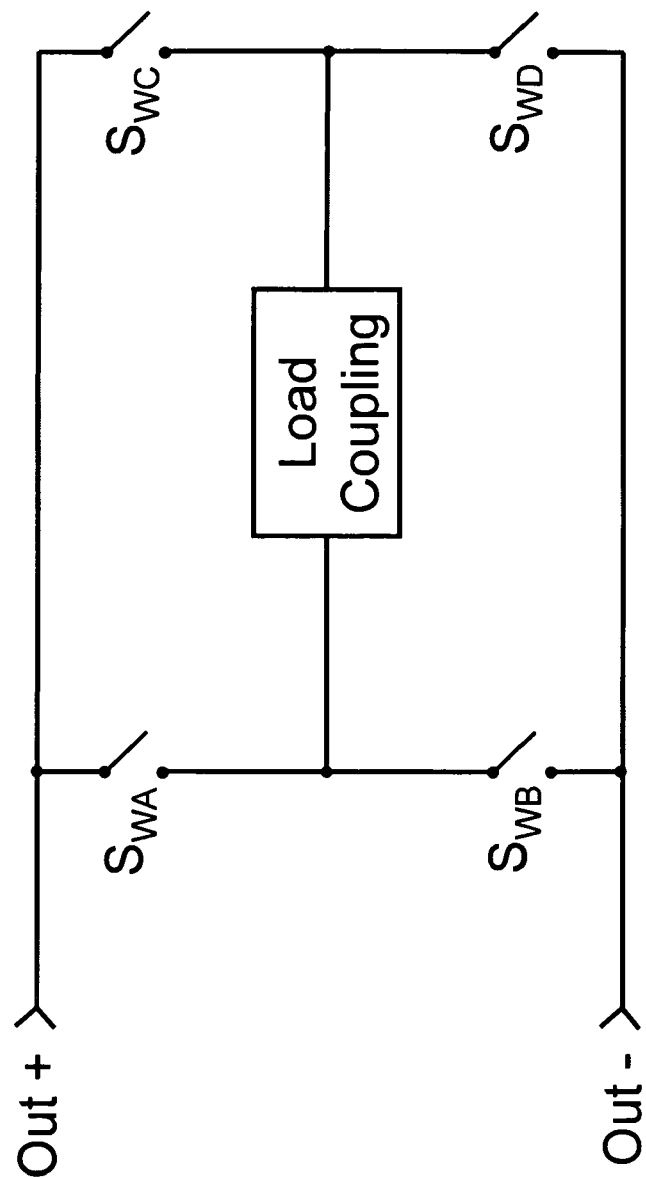
FIG. 4 illustrates a typical post converter circuit structure which can be used with an input boost pre-regulator circuit according to the prior art.

The ac input bridgeless boost converter of the subject invention has the property of bipolar output voltages. A conventional downstream post regulator that can be used with the ac input bridgeless boost converter of the subject invention is illustrated in FIG. 4. In the FIG. 4 circuit no connection to the neutral output terminal is required. With a power factor correction boost converter with universal line range input, i.e., 85 to 265 volts ac, the output voltages of the boost converter of the subject invention will be approximately +400 and −400 volts dc. The switches of the FIG. 4 circuit used for a post regulator with the bipolar boost converter must have voltage breakdown ratings in excess of 800 volts. For a conventional unidirectional output boost pre-regulator the output voltage is 400 volts dc and 500 volt transistors would likely be employed in a downstream post regulator having the structure of FIG. 4. For the FIG. 4 source switching network used with the bi-directional boost converter 1000 volt transistors would be the preferred choice.

Figure 7:
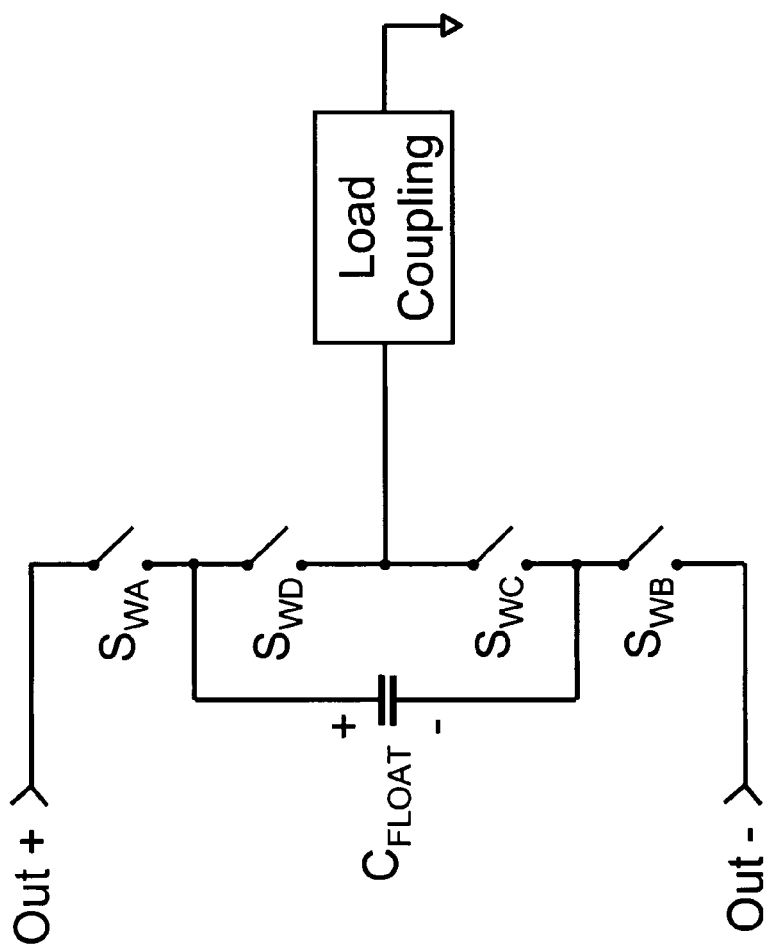
FIG. 7 illustrates a source switching network structure which can be used with the FIG. 5 circuit.
Figure 11:
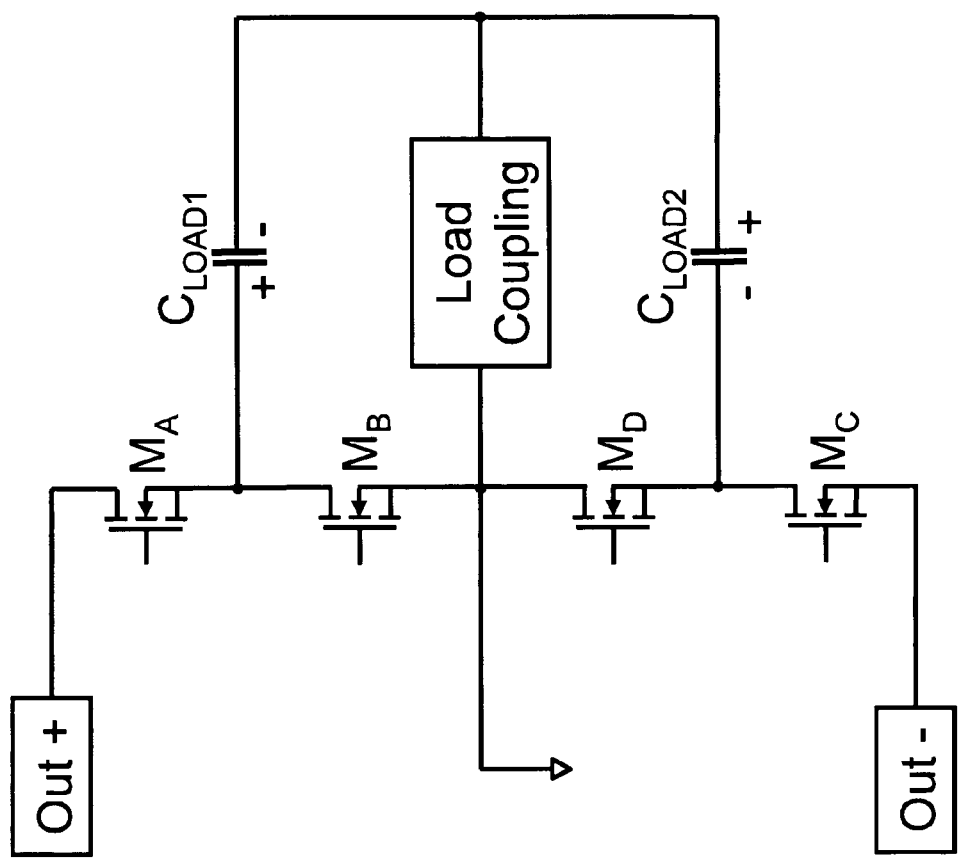
FIG. 11 illustrates a source switching network that reduces the voltage applied to the load coupling network by a factor of two compared to the FIG. 7 source switching network.
Figure 19:
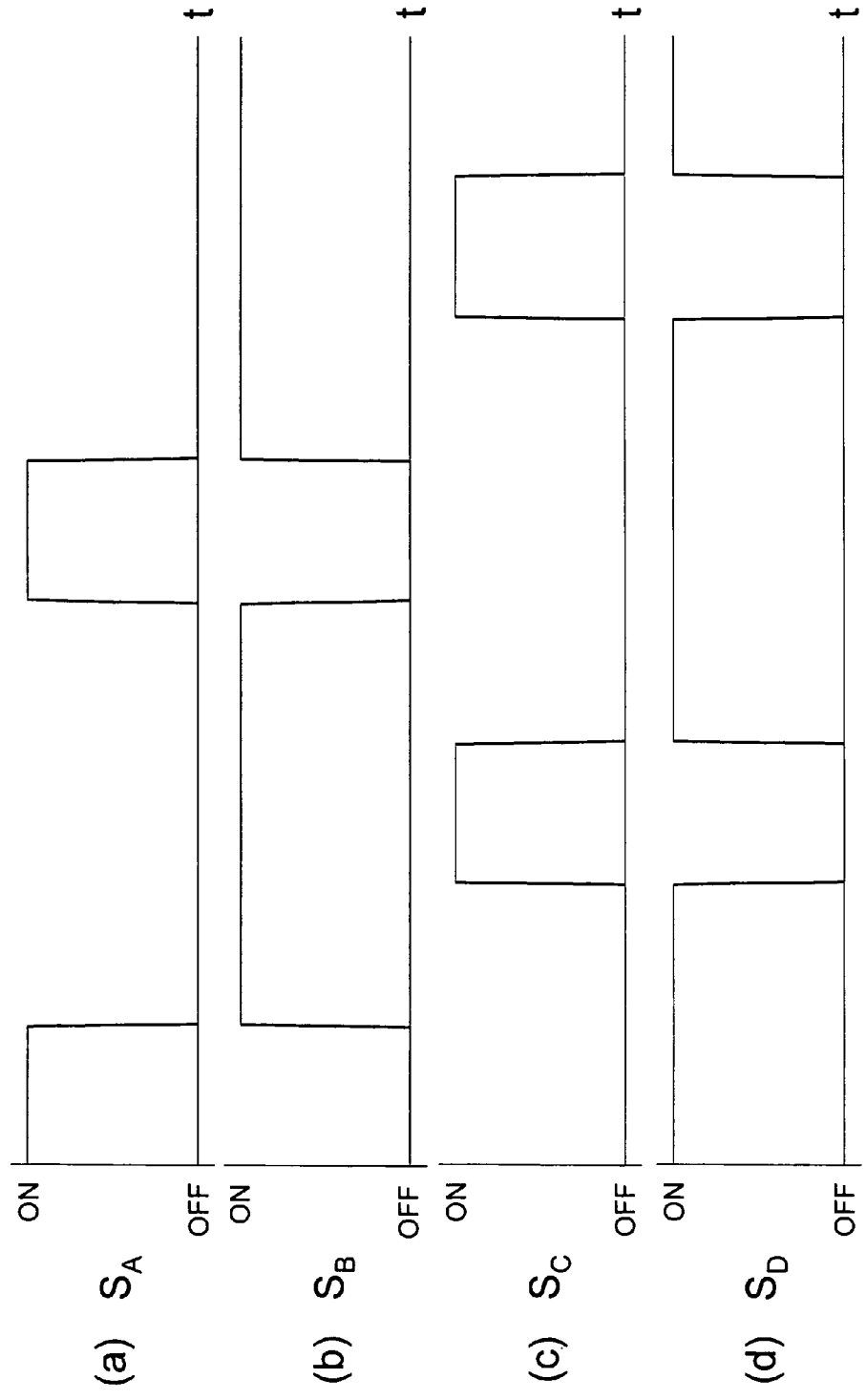
FIG. 19(*a*) illustrates a timing wave form for the $S_A$ switch for the circuit of FIG. 7 operating with pulse width modulation.
Figure 20:
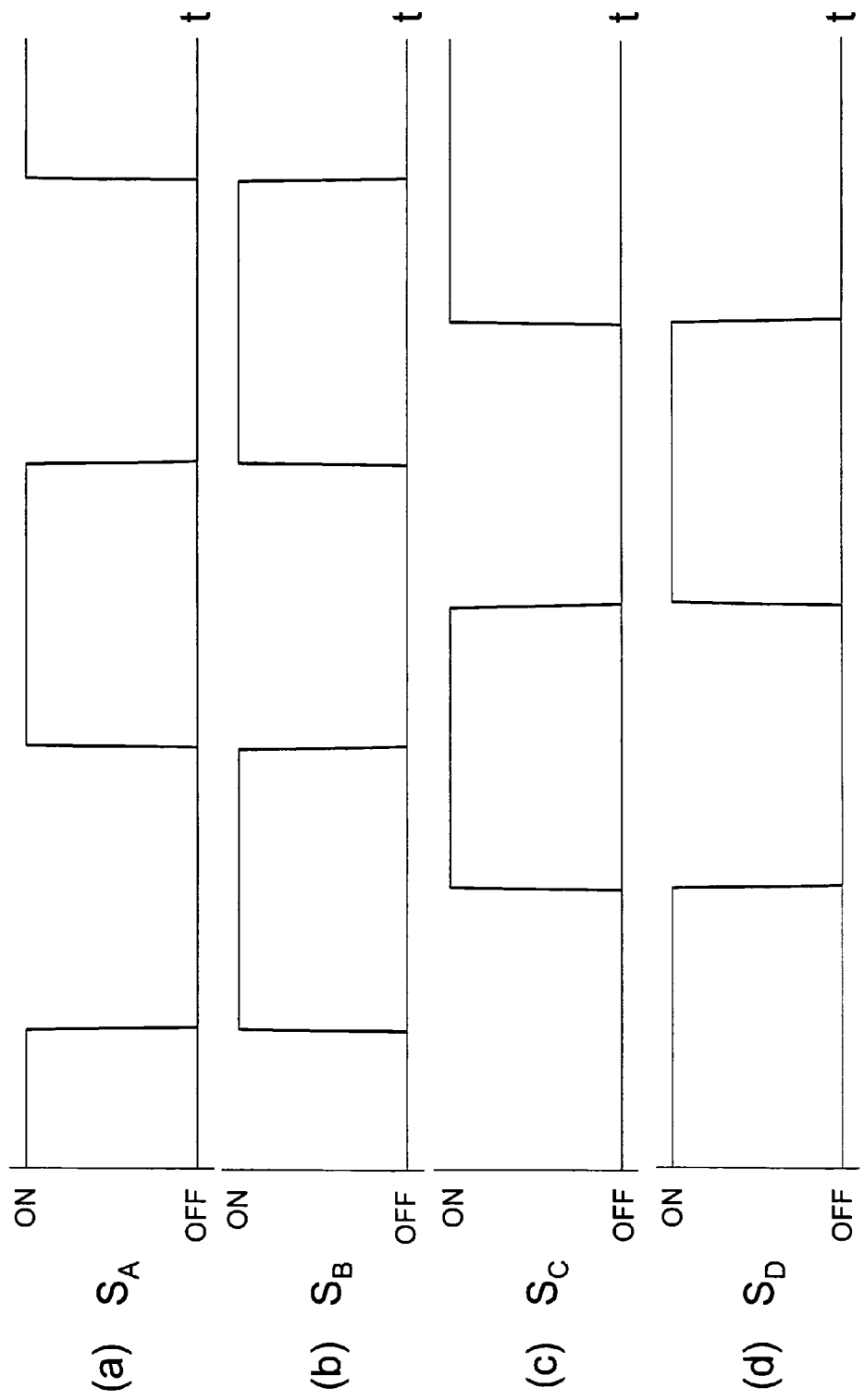
FIG. 20(*a*) illustrates a timing wave form for the $S_A$ switch for the circuit of FIG. 7 operating with phase shift modulation.
Figure 22:
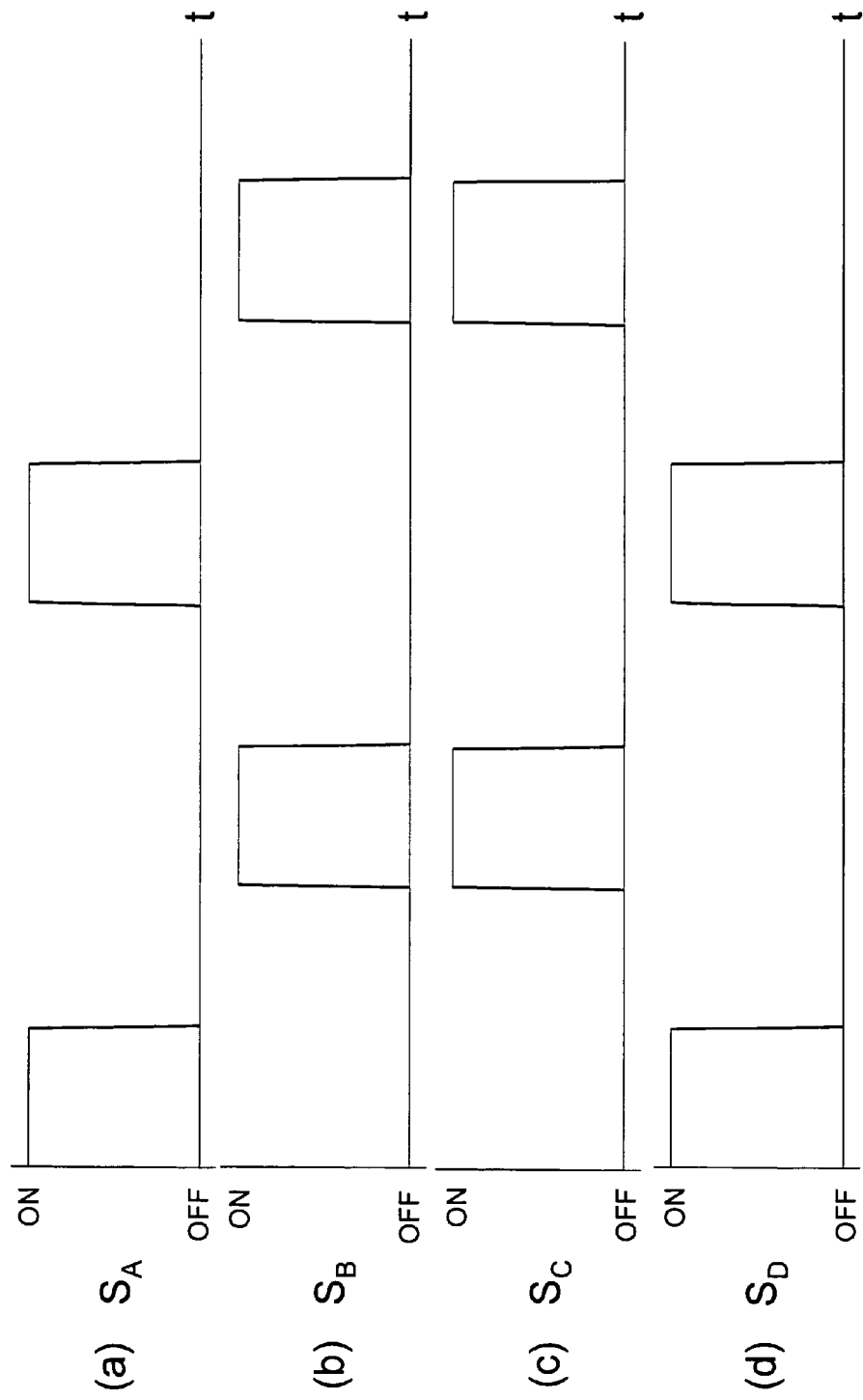
FIG. 22(*a*) illustrates a timing wave form for the $S_A$ switch for the circuit of FIG. 11 operating with three state pulse width modulation.
Figure 23:
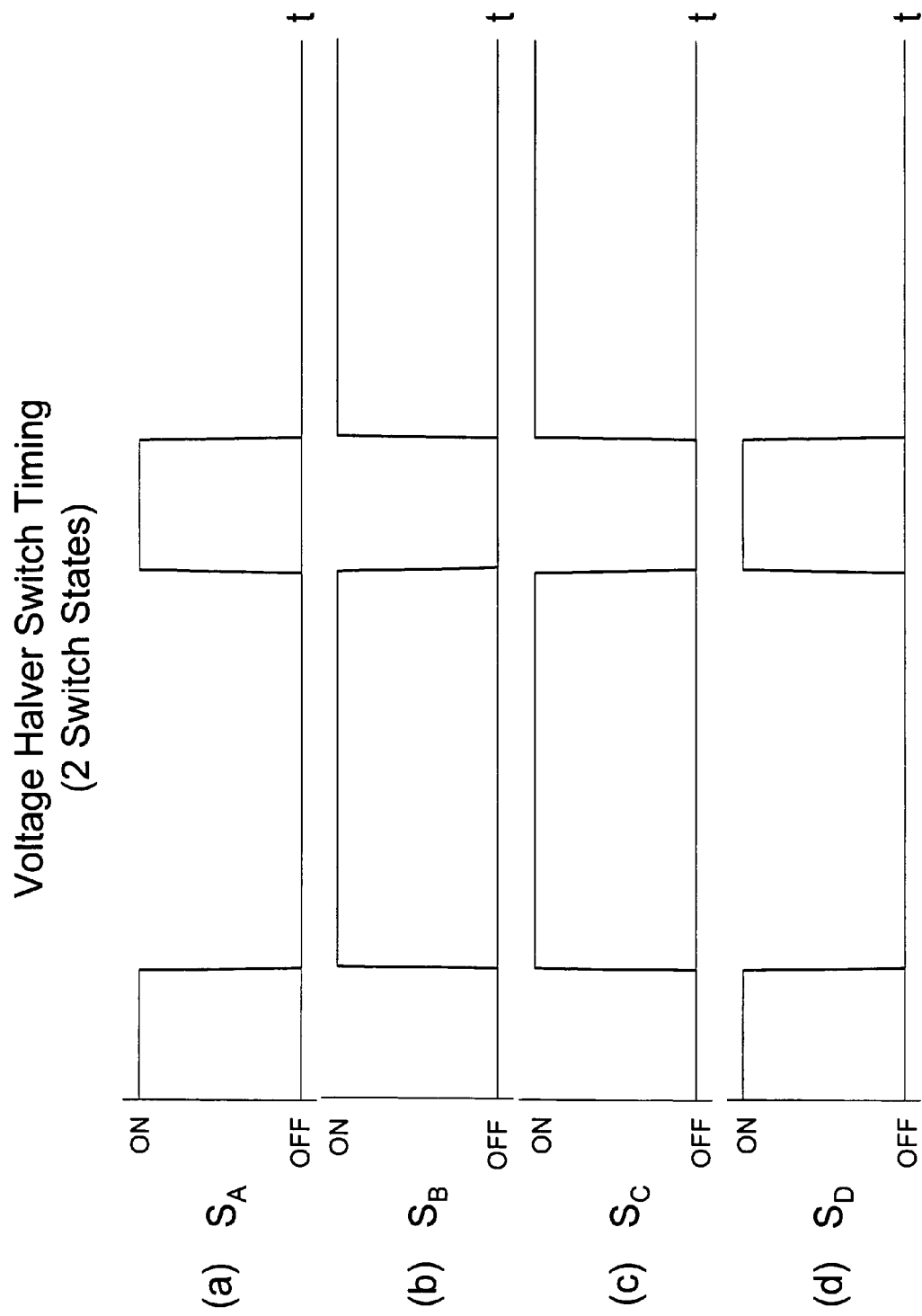
FIG. 23(a) illustrates a timing wave form for the $S_A$ switch for the circuit of FIG. 11 operating with two state pulse width modulation.
FIG. 23(b) illustrates a timing wave form for the $S_B$ switch for the circuit of FIG. 11 operating with two state pulse width modulation.
FIG. 23(c) illustrates a timing wave form for the $S_C$ switch for the circuit of FIG. 11 operating with two state pulse width modulation.
FIG. 23(d) illustrates a timing wave form for the $S_D$ switch for the circuit of FIG. 11 operating with two state pulse width modulation.

FIG. 7 illustrates a source switching network which can be used with a bipolar output boost pre-regulator. For a boost converter pre-regulator that generates positive and negative 400 volts the FIG. 7 source switching network would use 500 volt rated mosfets. Switch timing diagrams are illustrated in FIG. 19, FIG. 20, and FIG. 23 which are applicable to both the FIG. 7 source switching network and the FIG. 4 source switching network. The switch timing of FIG. 19 is applicable to a pulse width modulated (PWM) control equivalent to a PWM full wave bridge circuit. The voltages and currents of the switches in the FIG. 7 circuits are equivalent to the voltages and currents in the corresponding switches of the FIG. 4 circuit for the same load network with bipolar 400 volt boost outputs applied to the FIG. 7 circuit and unipolar 400 volt boost output applied to the FIG. 4 circuit. FIG. 20 illustrates switch timing for a phase shift modulated application for the switches of the FIG. 7 and FIG. 4 source switching networks. FIG. 23 illustrates a two state switch timing configuration which, in general, provides asymmetrical modulation for a average non-zero dc voltage to the load coupling network. With the FIG. 23 switch timing configuration the capacitor $C_{FLOAT}$ in FIG. 7 is obviated. The voltage applied to $C_{FLOAT}$ is equal to the supply voltage. $C_{FLOAT}$ provides a path for current flow when the voltage applied to the load coupling network is zero or nearly zero. In practice $C_{FLOAT}$ will be much smaller than $C_{FILT+}$ or $C_{FILT-}$. $C_{FILT+}$ and $C_{FILT-}$ need to have relatively low impedance at the frequency of the ac input source voltage and $C_{FLOAT}$ needs to have relatively low impedance at the switching frequency of the source switching network. A typical input source frequency is 60 hertz and a typical switching frequency for the source switching network might be 100 kilohertz. FIG. 11 illustrates another source switching network for use with a bi-directional output boost pre-regulator. The voltages generated at the load coupling network in FIG. 11 are half the voltages generated by the FIG. 7 circuit. In a sense the FIG. 7 source switching network is a full bridge equivalent network for bipolar voltage sources and FIG. 11 is a half bridge equivalent network for bipolar voltage sources. Comparing the FIG. 11 source switching network to a half bridge the capacitor number and capacitor stresses are identical and the total switch stresses are also identical, but in the FIG. 11 circuit there are twice as many switches each carrying half the current of a switch in a half bridge. In FIG. 11 the load capacitors $C_{LOAD1}$ and $C_{LOAD2}$ have an applied voltage of one half of the supply voltage, so that for plus and minus 400 volt supply rails the capacitor voltages will be 200 volts. In FIG. 11 switches that are on simultaneously are effectively parallel connected, and in FIG. 7 switches that are on simultaneously are effectively series connected. Switch timing diagrams for the FIG. 11 circuit are illustrated in FIGS. 22 and 23. The FIG. 22 switch timing diagram is applicable to load coupling networks that can tolerate an open source for part of the switching cycle. The FIG. 22 timing scheme employs three switch states, one of which is an open state. The FIG. 23 switch timing scheme employs two switch states, neither of which is open.

Figure 21:
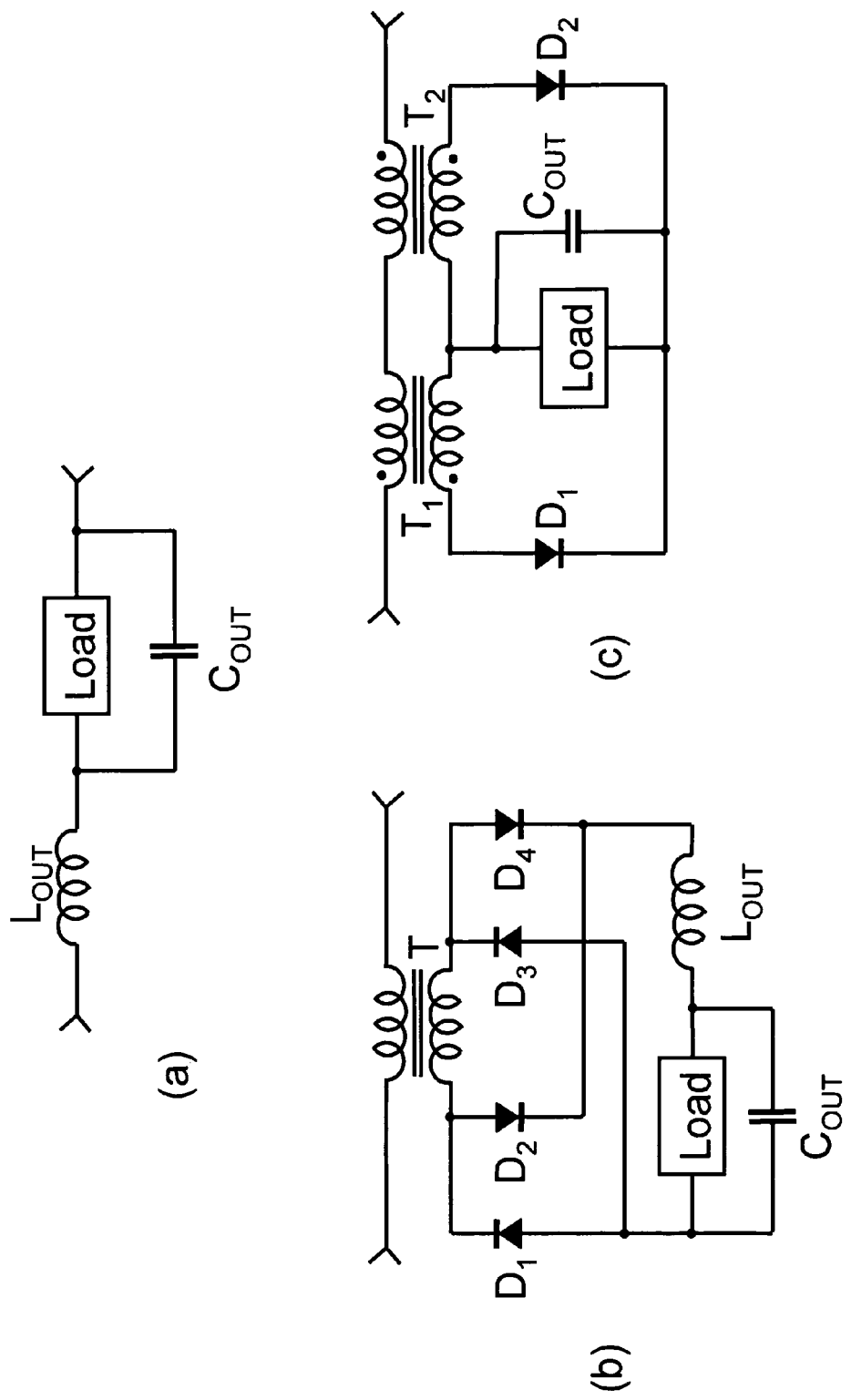
FIG. 21(*a*) illustrates a load coupling network for an inverter or amplifier.

FIG. 21(*a*) illustrates a non-isolated load network typical of an inverter or amplifier application. FIG. 21(*a*) illustrates an isolated full wave forward converter load network. FIG. 21(*c*) illustrates an isolated interleaved coupled inductor load network.

CONCLUSION, RAMIFICATIONS, AND SCOPE OF INVENTION

Thus the reader will see that the bridgeless bipolar output boost converter of the subject invention provides a compelling high efficiency approach to the problem of power factor correction without the problems of common mode noise and line current sensing inherent in prior art approaches. The reader will also see that the generation of bipolar outputs does not create a problem for post converters or load regulators. New load switching networks for bipolar voltage sources are revealed having identical switch complements with identical switch voltage and current stresses to more familiar and more common post regulator circuits used with unipolar output boost pre-regulators.

While my above description contains many specificities, these should not be construed as limitations on the scope of the invention, but rather, as exemplifications or preferred embodiments thereof. Many other variations are possible. For example, IGBTs, bipolar transistors, or junction FETs may be substituted for the mosfets illustrated as switch means in the subject application. The ac source may be a generator or other electromagnetic ac machine. Many other load coupling networks are possible. For example, for non-isolated loads a split and balanced inductor can be used to replace the single winding load inductor, for isolated applications a single transformer with dual secondary windings and a push pull rectifier rather than a full bridge rectifier may be used, or an inductor may be added in series with the primary transformer winding as a magnetic energy storage mechanism for zero voltage switching.

Accordingly, the scope of the invention should be determined not by the embodiments illustrated, but by the appended claims and their legal equivalents.

I claim:

1. A bipolar output boost converter comprising,
    an input series network having a first terminal and a second terminal comprising,
        a source of ac power,
        an input series inductance,
    a positive output terminal,
    a negative output terminal,
    a neutral output terminal directly connected to said first terminal of said input series network,
    first switch means having a first main terminal connected to said second terminal of said input series network and a second main terminal connected to said positive output terminal, second switch means having a first main terminal connected to said negative output terminal and a second main terminal connected to said second terminal of said input series network, third switch means having a first main terminal connected to said first terminal of said input series network and a second main terminal connected to said second terminal of said input series network, a first capacitor having a first terminal connected to said positive output terminal and a second terminal connected to said neutral output terminal, a second capacitor having a first terminal connected to said neutral output terminal and a second terminal connected to said negative output terminal.

2. A bipolar output boost converter as set forth in claim 1 wherein said first switch means and said second switch means comprise semiconductor diode rectifier switch means.

3. A bipolar output boost converter as set forth in claim 1 wherein said third switch means comprise series connected mosfets having a common source terminal connection.

4. A bipolar output boost converter as set forth in claim 1 wherein said third switch means comprise series connected mosfets having a common drain terminal connection.

5. A bipolar output boost converter as set forth in claim 1 wherein said first switch means and said second switch means comprise semiconductor synchronous rectifiers comprising mosfets.

6. A bipolar output boost converter as set forth in claim 1 further comprising a zero voltage switching cell.

7. A three terminal bipolar input full bridge equivalent source switching network comprising, a three terminal bipolar voltage source having a positive terminal, a negative terminal, and a neutral terminal, a load coupling network having a first terminal and having a second terminal wherein said second terminal of said load coupling network is connected to said neutral terminal of said three terminal bipolar voltage source, first switch means having a first main terminal connected to said positive terminal of said three terminal bipolar voltage source and having a second main terminal, second switch means having a first main terminal and having a second main terminal wherein said second main terminal is connected to said negative terminal of said three terminal bipolar voltage source, operable substantially in anti-synchronization to said first switch means, a first capacitor having a first terminal connected to said second main terminal of said first switch means and having a second terminal connected to said first main terminal of said second switch means, third switch means having a first main terminal connected to said first terminal of said load coupling network and having a second main terminal connected to said second terminal of said capacitor, fourth switch means having a first main terminal connected to said first terminal of said capacitor and having a second main terminal connected to said first terminal of said load coupling network, operable substantially in anti-synchronization to said third switch means.

8. A three terminal bipolar input full bridge equivalent source switching network as set forth in claim 7 wherein said switch means comprise semiconductor switch means.

9. A three terminal bipolar input full bridge equivalent source switching network as set forth in claim 8 wherein said semiconductor switch means comprise mosfets.

10. A three terminal bipolar input full bridge equivalent source switching network as set forth in claim 8 wherein said semiconductor switch means comprise IGBTs.

11. A three terminal bipolar input full bridge equivalent source switching network as set forth in claim 8 wherein said load coupling network comprises a series inductor and a capacitor.

12. A three terminal bipolar input full bridge equivalent source switching network as set forth in claim 8 wherein said load coupling network comprises a coupled magnetic circuit element, a rectifier network, and a capacitor.

13. A power factor corrected power converter comprising, an input series network having a first terminal and a second terminal comprising,
    a source of ac power,
    an input series inductance, a positive intermediate voltage terminal, a negative intermediate voltage terminal, a neutral intermediate voltage terminal connected to said first terminal of said input series network, first switch means having a first main terminal connected to said second terminal of said input series network and a second main terminal connected to said positive intermediate voltage terminal, second switch means having a first main terminal connected to said negative intermediate voltage terminal and a second main terminal connected to said second terminal of said input series network, third switch means having a first main terminal connected to said first terminal of said input series network and a second main terminal connected to said second terminal of said input series network, a first capacitor having a first terminal connected to said positive intermediate voltage terminal and a second terminal connected to said neutral intermediate voltage terminal, a second capacitor having a first terminal connected to said neutral intermediate voltage terminal and a second terminal connected to said negative intermediate voltage terminal, a load coupling network having a first terminal and having a second terminal wherein said second terminal of said load coupling network is connected to said neutral intermediate voltage terminal, fourth switch means having a first main terminal connected to said positive intermediate voltage terminal and having a second main terminal, fifth switch means having a first main terminal and having a second main terminal wherein said second main terminal is connected to said negative intermediate voltage terminal, operable substantially in anti-synchronization to said fourth switch means, a third capacitor having a first terminal connected to said second main terminal of said fourth switch means and having a second terminal connected to said first main terminal of said fifth switch means, sixth switch means having a first main terminal connected to said first terminal of said load coupling network and having a second main terminal connected to said second terminal of said third capacitor, seventh switch means having a first main terminal connected to said first terminal of said third capacitor and having a second main terminal connected to said first terminal of said load coupling network, operable substantially in anti-synchronization to said sixth switch means.

* * * * *